(12) United States Patent
Kodaira et al.

(10) Patent No.: US 12,290,971 B2
(45) Date of Patent: May 6, 2025

(54) INJECTION MOLDING SYSTEM

(71) Applicants: Canon Virginia, Inc., Newport News, VA (US); CANON U.S.A., INC., Melville, NY (US)

(72) Inventors: Koki Kodaira, Tokyo (JP); Yuichi Yanahara, Moriyama (JP); Yohei Minatoya, Tokyo (JP); Junko Tajima, Amsterdam (NL)

(73) Assignees: Canon Virginia, Inc., Newport News, VA (US); Canon U.S.A., Inc., Melville, NY (US)

( * ) Notice: Subject to any disclaimer, the term of this patent is extended or adjusted under 35 U.S.C. 154(b) by 339 days.

(21) Appl. No.: 17/277,722

(22) PCT Filed: Sep. 19, 2019

(86) PCT No.: PCT/US2019/051983
§ 371 (c)(1),
(2) Date: Mar. 18, 2021

(87) PCT Pub. No.: WO2020/061348
PCT Pub. Date: Mar. 26, 2020

(65) Prior Publication Data
US 2021/0354358 A1  Nov. 18, 2021

Related U.S. Application Data

(60) Provisional application No. 62/734,914, filed on Sep. 21, 2018.

(51) Int. Cl.
*B29C 45/80* (2006.01)
*B29C 45/04* (2006.01)

(52) U.S. Cl.
CPC .......... *B29C 45/80* (2013.01); *B29C 45/0433* (2013.01); *B29C 2945/76013* (2013.01);
(Continued)

(58) Field of Classification Search
CPC ................ B29C 45/80; B29C 45/0433; B29C 2945/76013; B29C 2945/76083
See application file for complete search history.

(56) References Cited

U.S. PATENT DOCUMENTS

| 5,314,327 A | 5/1994 | Stein |
|---|---|---|
| 11,104,050 B2 | 8/2021 | Nakamura |

(Continued)

FOREIGN PATENT DOCUMENTS

| CN | 106553309 A | 4/2017 |
|---|---|---|
| JP | H04-110120 A | 4/1992 |

(Continued)

*Primary Examiner* — Alison L Hindenlang
*Assistant Examiner* — Debjani Roy
(74) *Attorney, Agent, or Firm* — Canon U.S.A., Inc., IP Division

(57) ABSTRACT

An injection molding system includes an injection molding apparatus that performs injection molding with a die and a conveyor apparatus on one side of the injection molding apparatus that inserts the die into the injection molding apparatus, where the conveyor apparatus includes an actuator connectable to the die. The injection molding system also includes a die detection unit that detects the conveyed die, an actuator detection unit that detects a state of the actuator, and a controller that controls the conveyor apparatus to prohibit a conveying operation of the die based on detection results by the die detection unit and the actuator detection unit.

18 Claims, 24 Drawing Sheets

(52) U.S. Cl.
CPC .............. *B29C 2945/76083* (2013.01); *B29C 2945/76321* (2013.01)

(56) References Cited

U.S. PATENT DOCUMENTS

| | | | |
|---|---|---|---|
| 2016/0368194 A1* | 12/2016 | Takeda | .................... B29C 45/73 |
| 2018/0009146 A1 | 1/2018 | Nakamura | |
| 2018/0147765 A1* | 5/2018 | Nanri | ....................... B29C 45/66 |
| 2022/0402182 A1* | 12/2022 | Kodaira | .............. B29C 45/0408 |

FOREIGN PATENT DOCUMENTS

| | | | |
|---|---|---|---|
| JP | H05-329863 A | | 12/1993 |
| JP | H08-039601 A | | 2/1996 |
| JP | H08-039642 A | | 2/1996 |
| JP | H09-295007 A | | 11/1997 |
| JP | H10175721 A | | 6/1998 |
| JP | 2002267173 A | | 9/2002 |
| JP | 2004-155051 A | | 6/2004 |
| JP | 2013095040 | * | 5/2013 |
| JP | 2013095040 A | | 5/2013 |
| JP | 2018001738 A | | 1/2018 |

* cited by examiner

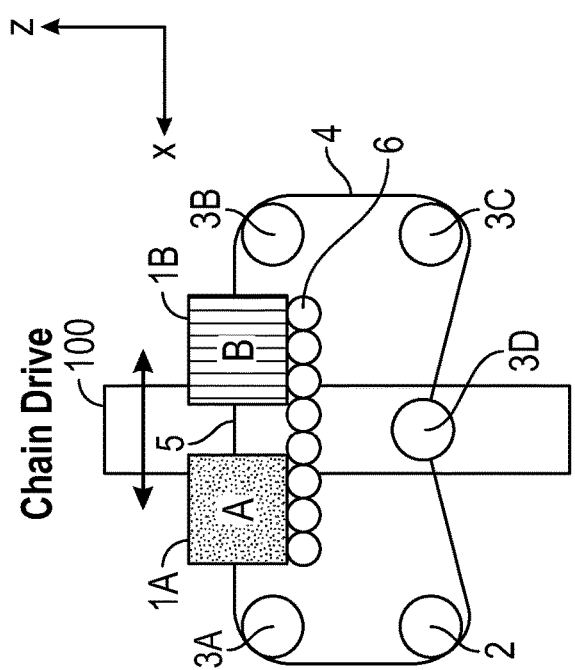
FIG. 10A
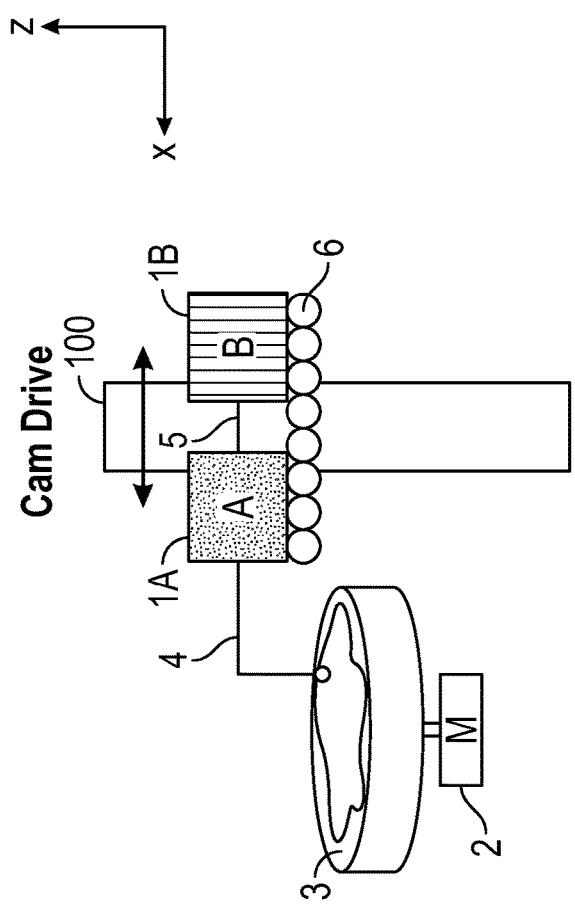
FIG. 10B1
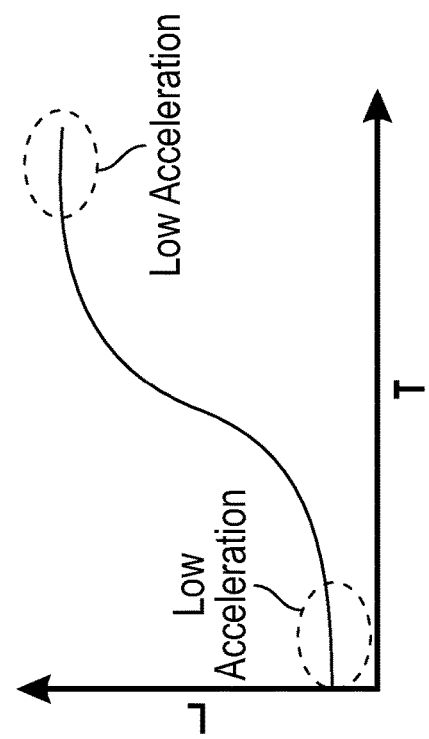
FIG. 10B2

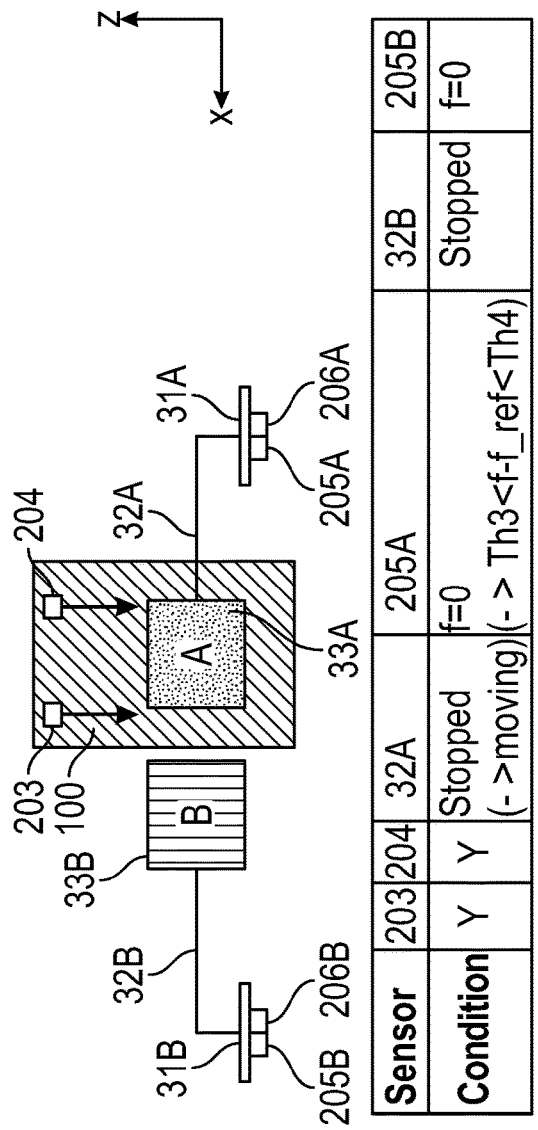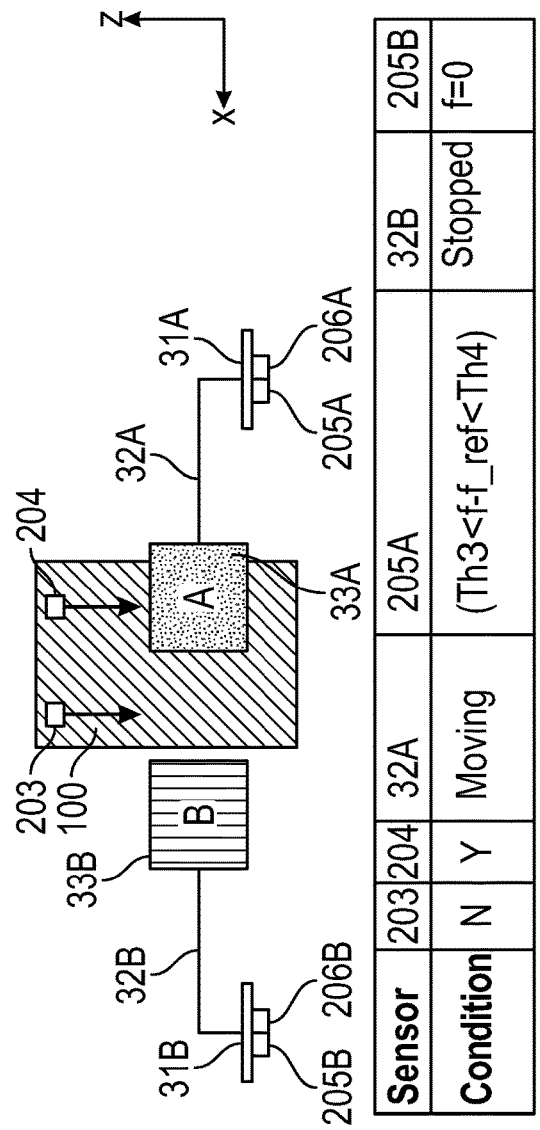
FIG. 13A
FIG. 13B

INJECTION MOLDING SYSTEM

CROSS-REFERENCE TO RELATED APPLICATIONS

This application is the National Phase application of PCT Application No. PCT/US2019/051983, filed on Sep. 19, 2019 which claims the benefit of U.S. Provisional Patent Application 62/734,914 filed Sep. 21, 2018, all of which are incorporated by reference herein in its entirety.

BACKGROUND

Field

The present disclosure relates to injection molding systems and methods of use.

Description of the Related Art

In manufacturing of molded parts by an injection molding machine, injection molding includes an injection process of injecting a resin into a die after clamping, a dwelling process of pressing the resin into the die at a high pressure in order to compensate for a volume decrease due to solidification of the resin, a cooling process of keeping the molded part in the die until the resin is solidified, and an ejecting process of ejecting the molded part from the die. The injection molding processes are performed repeatedly to obtain the desired number of molded parts. After a predetermined number of moldings are performed with one die, the die is ejected from the injection molding machine, the next die is setup and die inserted into the injection molding machine, and then the predetermined number of injection moldings with the next die is performed.

US2018/0009146 discusses a manufacturing method for molded parts while switching between two dies (molds) for one injection molding machine. US2018/0009146 discloses the manufacturing method that two dies are alternately inserted into the injection molding machine.

The injection molding system of US2018/0009146 includes an actuator for conveying the die. The actuator is linked with the die by a linking unit. When the actuator conveys the die, there is a possibility that the linking unit can break due to the weight of the die. Therefore, it is preferable that the injection molding system can detect whether the die is moved to a specified position.

SUMMARY

According to an aspect of the present disclosure, an injection molding system comprises an injection molding apparatus configured to perform injection molding with a die and a conveyor apparatus on one side of the injection molding apparatus and configured to insert the die into the injection molding apparatus, wherein the conveyor apparatus includes an actuator connectable to the die. The injection molding system also comprises a die detection unit configured to detect the die conveyed by the conveyor apparatus, an actuator detection unit configured to detect a state of the actuator, and a controller configured to control the conveyor apparatus to, based on a detection result by the die detection unit and a detection result by the actuator detection unit, prohibit a conveying operation of the die.

BRIEF DESCRIPTION OF THE DRAWINGS

FIGS. 10A-10H are diagrams illustrating an alternate mechanism for moving a die.
FIGS. 13A-13E illustrate situations where one die is conveyed out of the injection position and then the other die is conveyed into the injection position, according to another exemplary embodiment.

Figure 1:
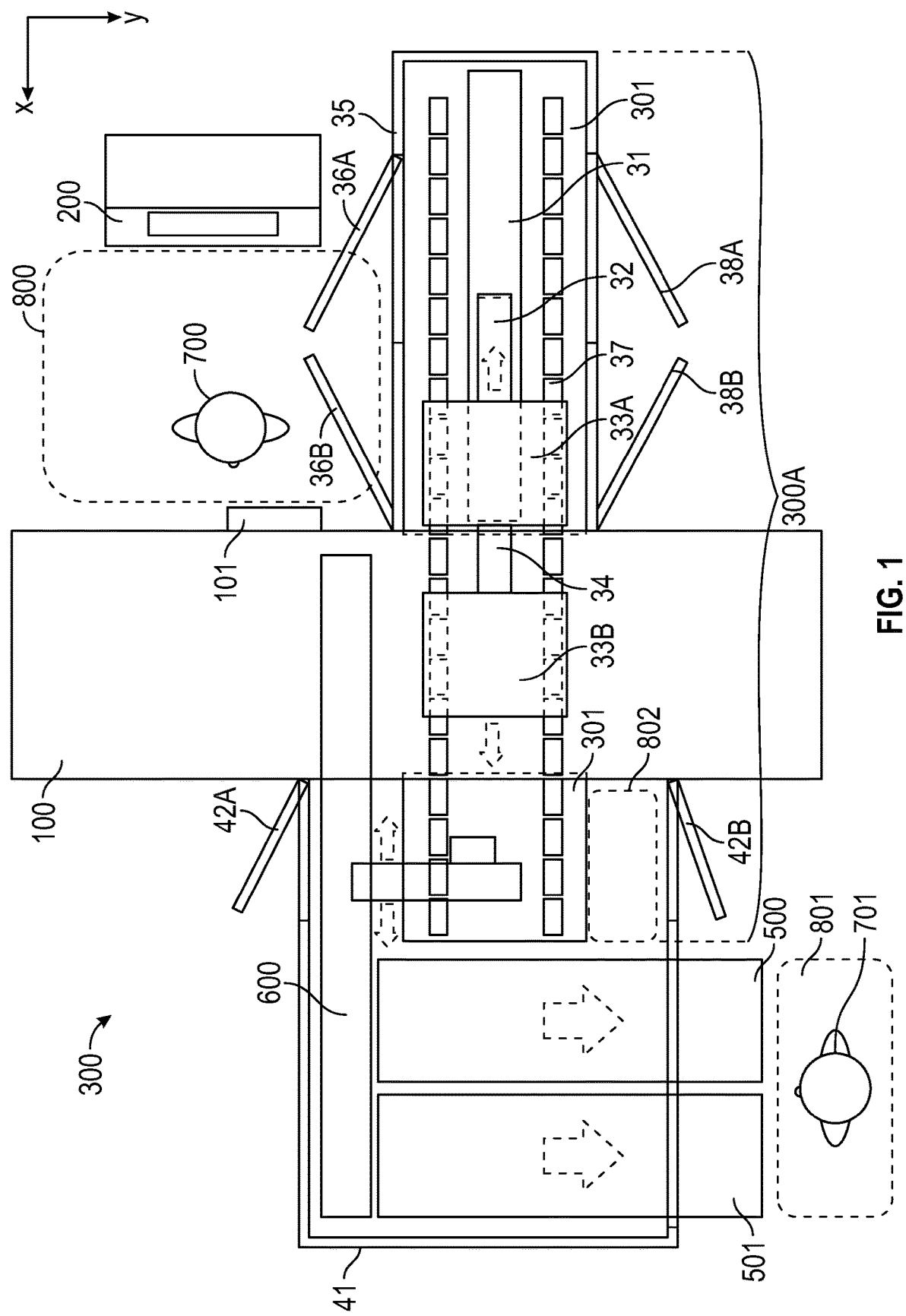
FIG. 1 is a top view of an injection molding system.

Throughout the Figures, the same reference numerals and characters, unless otherwise stated, are used to denote like features, elements, components or portions of the illustrated embodiments. While the subject disclosure will be described in detail with reference to the Figures, it is done so in connection with the illustrative exemplary embodiments. Changes and modifications can be made to the described exemplary embodiments without departing from the true scope and spirit of the subject disclosure as defined by the appended claims.

DESCRIPTION OF THE EMBODIMENTS

<System Layout>

FIG. 1 is a top view of an injection molding system 300. The injection molding system 300 includes an injection molding machine 100. The injection molding machine 100 injects a resin into a die (mold). A molding material is not limited to the resin. It is adaptable to other suitable materials such as wax or metal.

The injection molding machine 100 illustrated in FIG. 1 is used to manufacture molded parts, and includes a mechanism to inject the resin into dies 33A, 33B and a mechanism to take out the molded parts from the dies 33A, 33B.

The injection molding system 300 includes a conveyor machine 300A. The conveyor machine 300A moves two dies to an injection position of the injection molding machine 100 alternately. The conveyor machine 300A includes a table 301, an actuator 31, and a linking unit 32 for linking the actuator 31 and the die 33A, and a linking unit 34 for linking the die 33A and the die 33B.

The table 301 includes free rollers 37 to transfer the dies. The free rollers 37 are mounted on the table 301. The free rollers 37 lower friction when moving the dies 33A, 33B and to move them smoothly. The die 33A and the die 33B are linked by the linking unit 34, and the die 33A is linked by the linking unit 32 to the actuator 31 mounted on the table 301. Therefore, when the actuator 31 moves the die 33A in X-axis direction, the die 33A and the die 33B move in the same X-axis direction.

The actuator 31 is a drive unit to move the linked two dies. By moving the linked two dies on top of the table 301, when one of the dies is inside the injection molding machine 100, the other die is cooled off outside of the injection molding machine 100. The dies 33A and 33B can alternate between the injection position and a cooling position by the actuator 31. The injection position and the cooling position are described below.

An operation panel 101 for controlling the injection molding machine 100 is installed on side of the injection molding machine 100. In detail, the operation panel 101 is mounted on a side surface of the injection molding machine 100. By using this operation panel 101, an operator 700 can operate condition setting and operation setting of the injection molding machine 100. The operation panel 101 includes such as a touch screen, display, keyboard, and button. Hereinafter, Seen from the injection molding machine 100, the operation panel 101 is installed on a negative side in X-axis direction. This side will be called an operator side.

As viewed from the injection molding machine 100, the actuator 31 is installed on the negative side in X-axis direction. However, it can be installed on a positive side in X-axis direction, or be mounted inside the injection molding machine 100.

A system controller 200 for controlling the conveyor machine 300A is installed on the operator side of the injection molding machine 100. The system controller 200 includes CPU, ROM and RAM. In addition to that, the system controller 200 includes such as a touch screen, display, keyboard, and button so that the operator 700 can operate the system controller 200. For this reason, the system controller 200 also can be called as an operational panel.

The operation panel 101 and the system controller 200 are arranged in the X-axis direction across the operator 700. Here, X-axis direction is also called a conveying direction in which the conveyor machine 300A conveys the dies 33A and 33B. The system controller 200 can control the actuator 31 that moves the dies and communicate signals with the injection molding machine 100.

The operation panel 101 and the system controller 200 are operable from the operator 700. The operator 700 can set and instruct on the injection molding machine 100 from the operation panel 101, or set and instruct movement of the dies from the system controller 200 without moving from an area 800 and by only facing another direction. In FIG. 1, the area 800 is surrounded by the injection molding machine 100, the conveyor machine 300A, and the system controller 200. Also, the system controller 200 can be mounted on the same side as the operation panel 101, or can be mounted on the conveyor machine 300A.

The operation panel 101 is sold as a part of the injection molding machine 100 or with the injection molding machine 100, and the conveyor machine 300A can be added later to the injection molding machine 100. Therefore, it is preferable that the operation panel 101 is installed on the injection molding machine 100, and the system controller 200 is separately installed with the injection molding machine 100.

It will decrease assembly work during installation. Also, by installing the system controller 200 on the operator side, it will improve operational usability.

A safety cover 35 is installed in order to cover the table 301, and it prevents scattering of resin, or prevents the operator 700 from accidently getting caught in the injection molding machine 100 or the conveyor machine 300A. Moreover, it prevents external debris or parts from contaminating the injection molding machine 100 or the conveyor machine 300A because the external debris and parts may cause the breakdown of the injection molding system 300. There are accessible doors (36A, 36B) facing the operator 700, and the operator 700 can access the table 301 through these doors (36A, 36B). The accessible doors 36A, 36B are movable in the area 800, which is between the operation panel 101 and the system controller 200. This makes it possible for changeover process of the two dies (33A, 33B) or adjustment to the actuator 31, maintenance of the actuator 31, and maintenance of the free roller 37.

There are doors 38A, 38B on the opposite side to the accessible doors 36A, 36B in the Y-axis direction. The doors 38A, 38B are useful when at least two people do a work such as replacing actuator 31.

The injection molding machine 100 includes a robot arm 600. The robot arm 600 can take out molded parts from the dies that was molded in the injection molding machine 100. The robot arm 600 removes the molded parts from the dies by vacuuming air.

Seen from the injection molding machine 100, a safety cover 41 is installed on the other side of the operator side in X-axis direction. The other side of the operator side will be called an unloading side. Similar to the operator side, there are the safety cover 41 that covers the table 301, an unloading conveyor 500, and an unloading conveyor 501 in the unloading side. The safety cover 41 includes accessible doors (42A, 42B).

From the doors 42A, B, an operation after changing dies such as connecting a water line, a hot runner, and a heater to the changed die respectively can be performed. The doors 42A, 42B make it possible to perform a maintenance work on the die when the die stops on the unloading side, or make it possible to change dies when the operator 700 cannot do work on the operator side.

The unloading conveyor 500 is a conveyor to flow the molded part removed from the die A, and the unloading conveyor 501 is a conveyor to flow the molded part removed from the die B. After the molded parts are removed from the injection molding machine 100, the robot arm 600 places it on top of the unloading conveyor 500, 501. The robot arm 600 can also unload the molded parts removed from the die A to the unloading conveyor 501, the molded parts removed from the die B to the unloading conveyor 500.

If it takes a longer time to move the molded parts removed from the die to the unloading conveyor 500, 501 by the robot arm 600 than the time interval for the molded parts to complete in the die, after the robot arm 600 has removed the molded parts, the robot arm 600 can pass the molded parts to another robot arm. This another robot arm can place the molded parts on the unloading conveyor 500, 501. In this way, the time completed molded parts are waiting inside the injection molding machine 100 can be reduced.

After placing the molded parts onto the unloading conveyor 500, 501, a belt of the unloading conveyor 500, 501 moves, and the molded parts are moved. At the end of the unloading conveyor 500,501, an operator 701 picks up the molded parts from the unloading conveyor 500, 501, and put them in a box. The operator 701 can perform boxing and checking process in a fixed position without moving from an area 801. It reduces wasteful moves and improves working efficiency.

The robot arm 600 unloads the molded parts on the unloading side in FIG. 1. However, it can unloads the molded parts on the operator side.

The unloading conveyors 500, 501 are lined up in X-axis direction and convey the molded parts in Y-axis direction in FIG. 1. However, they can be lined in Y-axis direction and convey the molded parts in X axis direction.

The unloading side process is not limited to above description. The molded parts can be unloaded to an annealing oven where the molded parts can be cooled, or the robot arm 600 can directly load the molding parts in a finished product box. The process of loading molded parts into the finished product box can be done by the operator 701 or can be automated. The processes on the unloading side occur after the molded parts are complete, while the processes on the operator side relate to producing the molded parts.

<Linking Unit Between a Die and an Actuator>

Figure 2:
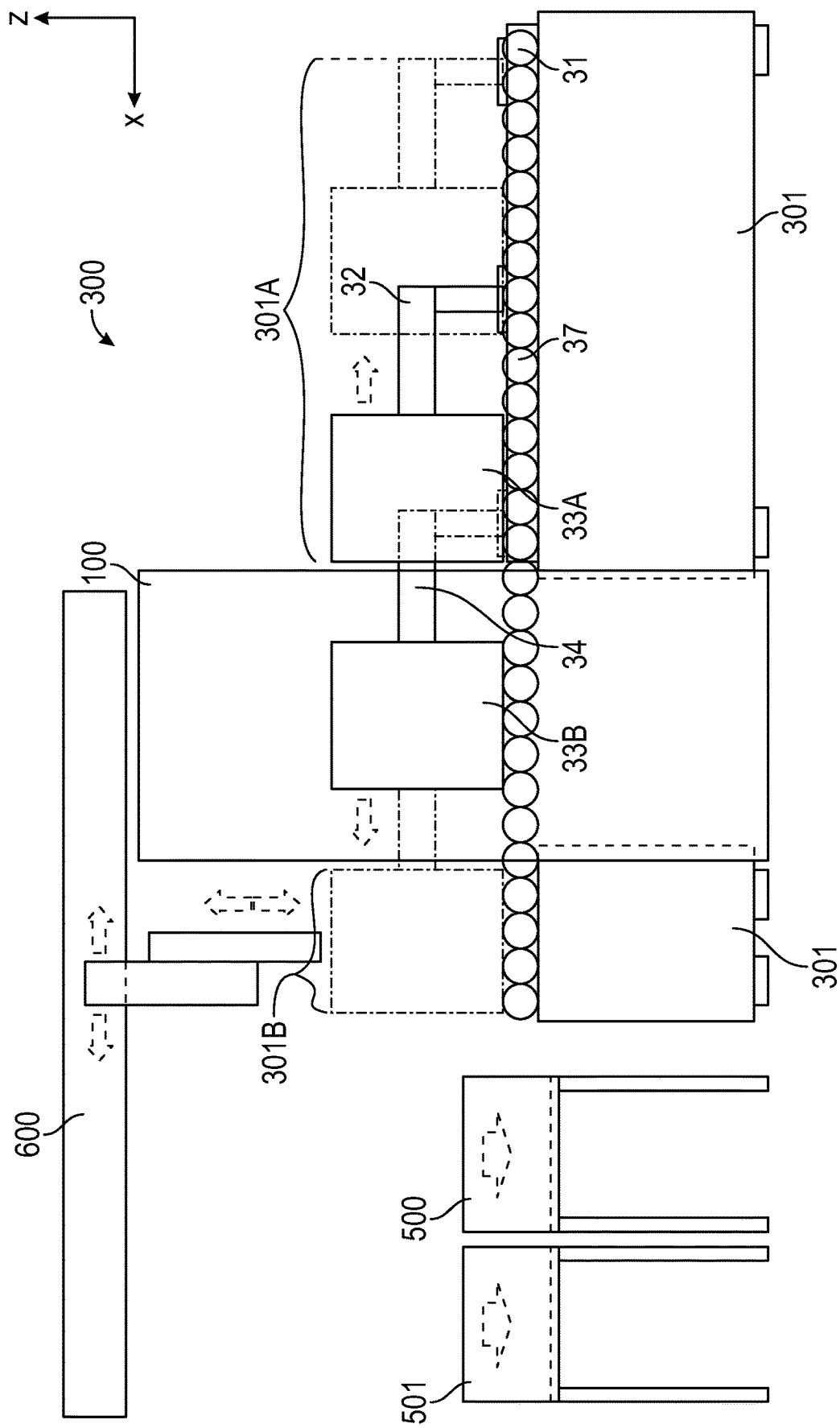
FIG. 2 is a side view of an injection molding system.

FIG. 2 illustrates the side view of the injection molding system 300 in this embodiment.

Length of the table 301 differs between the operator side and the unloading side.

Here, a part of the table 301 in the operator side will be called a table 301A, and a part of the table 301 in the unloading side will be called a table 301B.

The table 301A has a length where the die 33A, the die 33B, and the linking unit 34 can be outside of the injection molding machine 100 at the same time. Also, the table 301A includes the actuator 31.

That is, the actuator 31 moves the dies in X-axis negative direction, and the two dies are completely shown up on the table 301A. By showing the two dies completely outside of the injection molding machine 100, it becomes possible to change the dies only from the operator side. A crane is often used for changing the dies, the two dies can be changed at the same time without moving a crane-type instrument between the operator side and the unloading side of the injection molding machine 100.

In addition to that, during the maintenance for the injection molding machine 100, it is possible to retract the die 33A and the die 33B to the table 301A. In other words, it is possible to create a condition where no dies are inside the injection molding machine 100. From this, opening and closing of the platen in the injection molding machine 100 becomes possible. On the other hand, the table 301B only needs to be long enough for the die 33B to move outside of the injection molding machine 100 when the die 33A is inside the injection molding machine 100.

As mentioned above in this embodiment, an operator work (user work) is performed such as equipment setting or instruction is done on one side of the injection molding machine 100. In addition to that, we can see that changing dies or repair type maintenance from the position that the operator performs setting and instruction.

On the other side of the injection molding machine 100 is the unloading side where it unloads the molded parts. In this way, the process related to producing the molded parts in one side, and to perform the process after the molded parts are completed on the other side. It improves the work efficiency of the operator working on the injection molding machine 100 and the conveyor machine 300A.

After transporting the molded parts, the unloading side has high possibility of being positioned on the aisle side to transfer the boxes with the molded parts. Therefore, by flowing the molded parts towards where the parts and people passing by, an operator work and a maintenance work such as setting or instruction in the calmer parts, and prevent work errors.

In a case where a plurality of the injection molding machine 100 are placed in a line to do work, it is possible to collect the finished parts in order and go to next process, so the work efficiency is good. Also, for example, when changing the dies, the crane needs to move on operator side, so there is no need to move around in many directions inside cramped plant, and work smoothly.

Figure 3A:
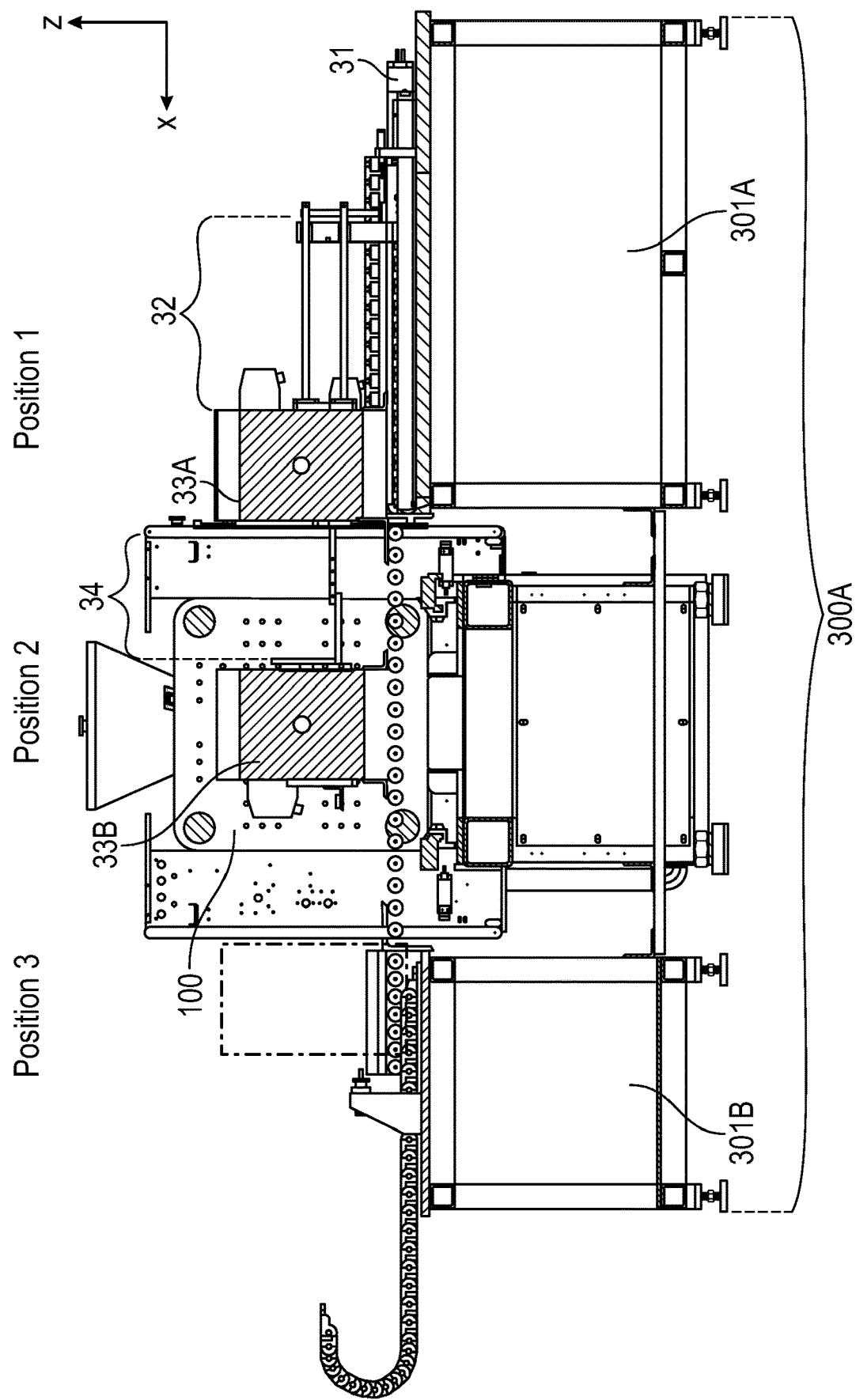
FIG. 3A is a cross sectional view of an injection molding system.

FIG. 3A illustrates the movement of the die 33A and the die 33B. FIG. 3A is a side view of the injection molding machine 100, the die 33A, the die 33B, the conveyor machine 300A, the table 301A, the table 301B, and the linking units 32 and 34. In FIG. 3A, possible positions of dies are illustrated as positions 1, 2, and 3. The position 2 is an injection position of the injection molding machine 100, and when a die is at the position 2, the injection molding machine 100 is able to inject resin into the die and to remove a molded part from the die. The positions 1 and 3 are cooling positions for cooling the dies 33A and 33B. By alternatingly moving the two dies into the injection position, and by enabling injection of resin, while one die is being cooled at the position 1 or 3, the other die can have resin injected at the position 2.

The linking unit 34 links the die 33B to the die 33A that is outside of the injection molding machine 100 while the die 33B is moved into the injection position. The linking unit 34 links the two dies in a distance as illustrated in FIG. 3A without bending or breaking the linking unit 34. When one of the dies is being used for the injection molding, the other die can be cooling.

Also, the linking unit 32 links the actuator 31 and the die 33A in a distance as illustrated in FIG. 3A without bending or breaking the linking unit 32. When the actuator 31 is moving, the die 33A can move to a specified position. In this way, the dies 33A, B can correctly move to the injection position and the cooling position by linking without bending or breaking.

Figure 3B:
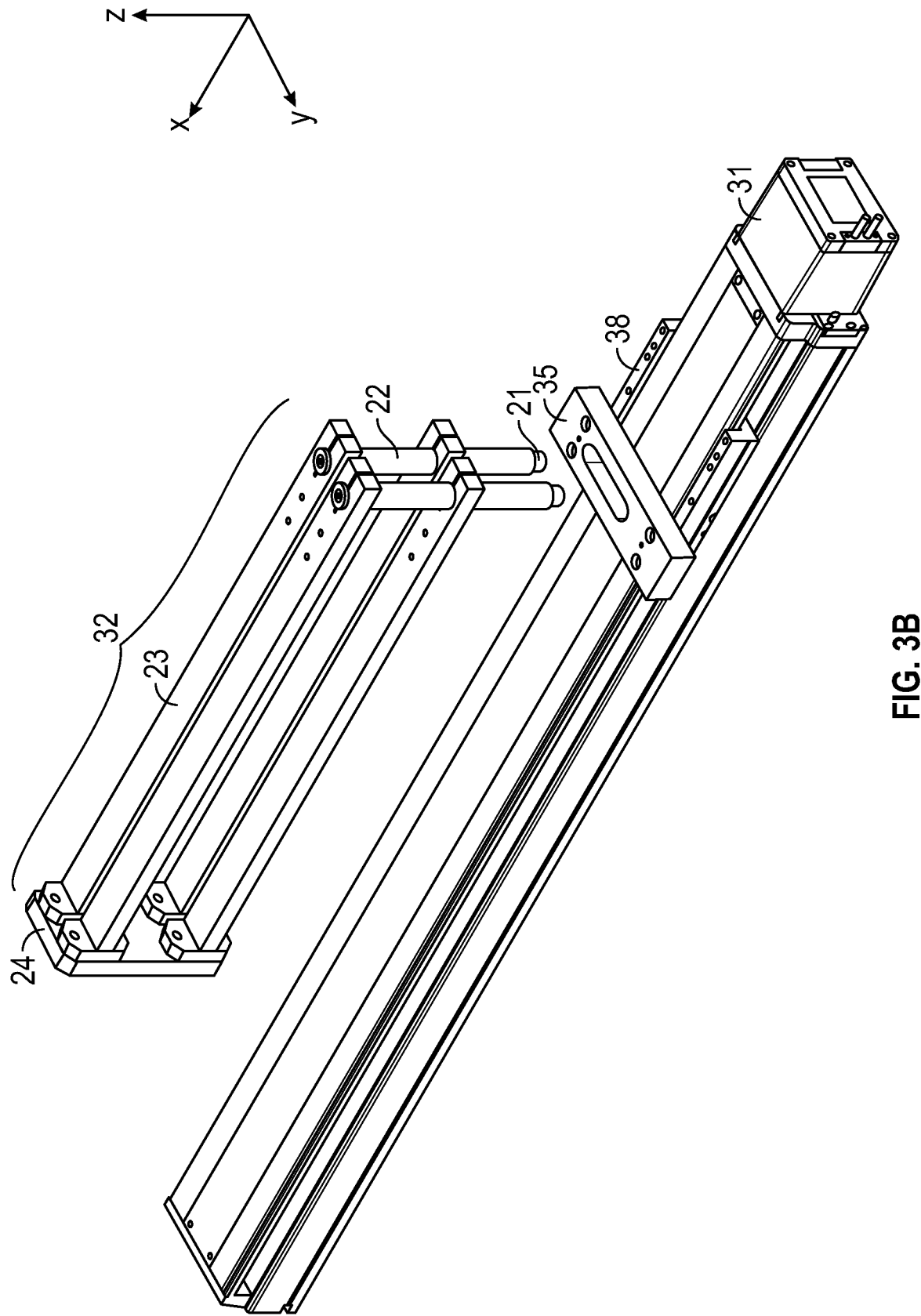
FIG. 3B is a perspective view of a linking unit and an actuator.

FIG. 3B illustrates details of the linking unit 32. The actuator 31 makes the die 33A movable through a slider 38, a plate 35 and the linking unit 32.

As illustrated in FIG. 3B, the linking unit 32 attaches a base plate 24 to the die 33A, and fastens four linked brackets 23, then fastens them to two shafts 22 that has cam follower 21 on tips. Also, the base plate 35 is fasten to the slider 38, and the cam follower 21 is inserted to the slots of the base plate 35, the die 33A and the actuator 31 are linked by the linking unit 32.

The die 33B and the die 33A are linked by the linking unit 34. By moving the die 33A, the die 33B can move in the moving direction of the die 33A. That is, in FIG. 3B, when the die 33A moves in X-axis positive direction, the die 33B also is movable in X-axis positive direction.

Figure 3D:
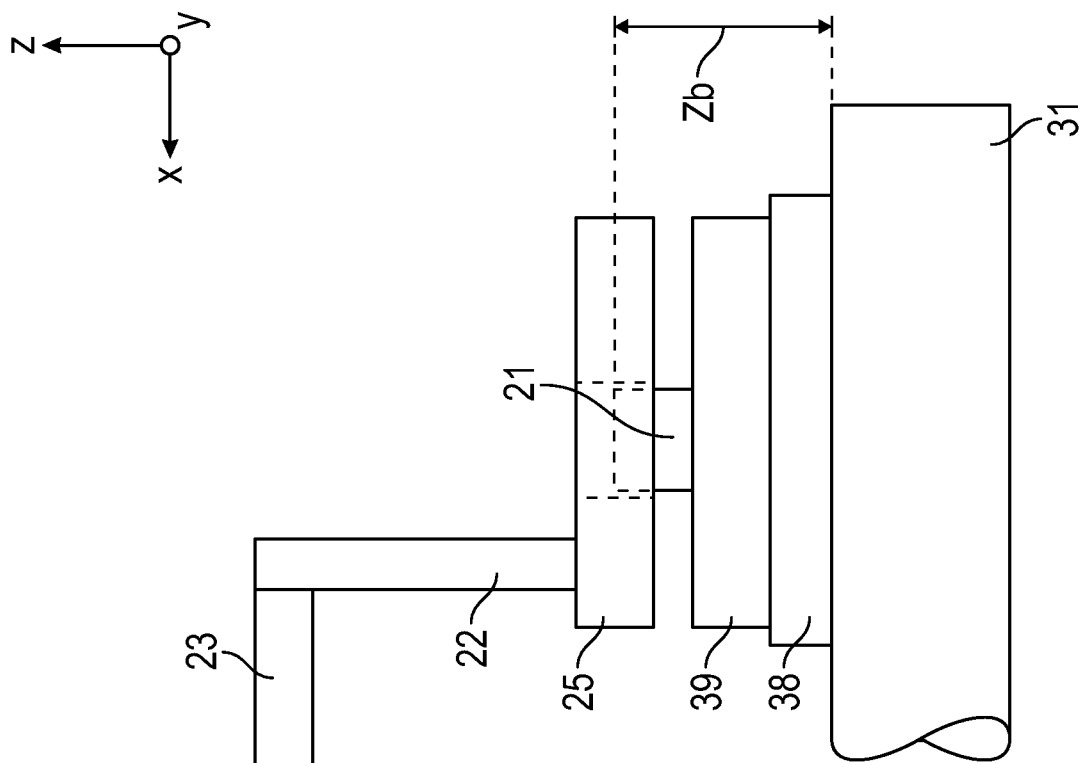
FIGS. 3C and 3D are side views of a linking unit and an actuator.
Figure 3C:
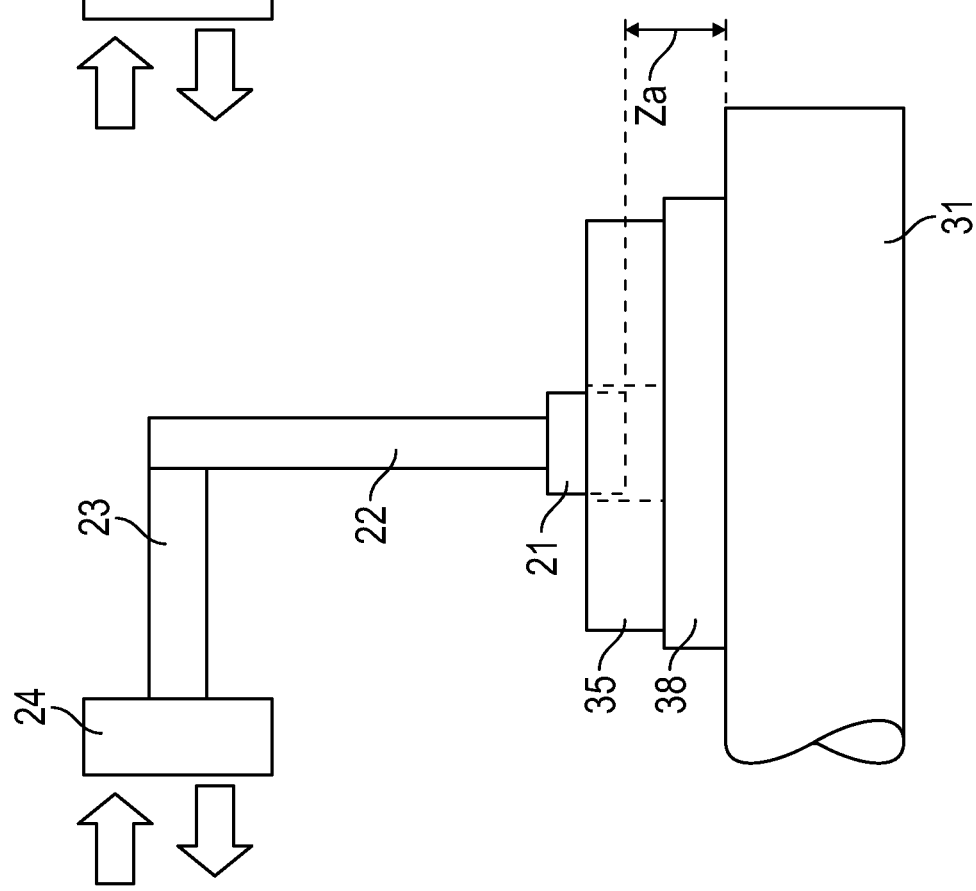

FIGS. 3C-3D illustrate the linking unit 32 between the die 33A and the actuator 31.

For the actuator 31, direct acting type actuator slide type is used. The actuator 31 is placed below the dies 33A, 33B in Z-axis direction. A movable range of the dies 33A, 33B in X-axis direction and overall length range of the actuator 31 overlap, which can result in a reduction in the size of the injection molding machine 100. Using one driving source enables simplification of the injection molding machine mechanism, which can reduce the number of parts of the injection molding machine, which results in a lower cost.

The actuator 31 is installable external to the injection molding machine 100, which makes maintenance on the actuator 31 easier.

Compared to the configuration of lining the actuator and the die in straight line, described below (see for example FIG. 10D), the configuration of FIGS. 3C-3D has the actuator positioned below dies in Z-axis direction, thus resulting in reduction of the size of the injection molding machine 100.

Figure 10D:
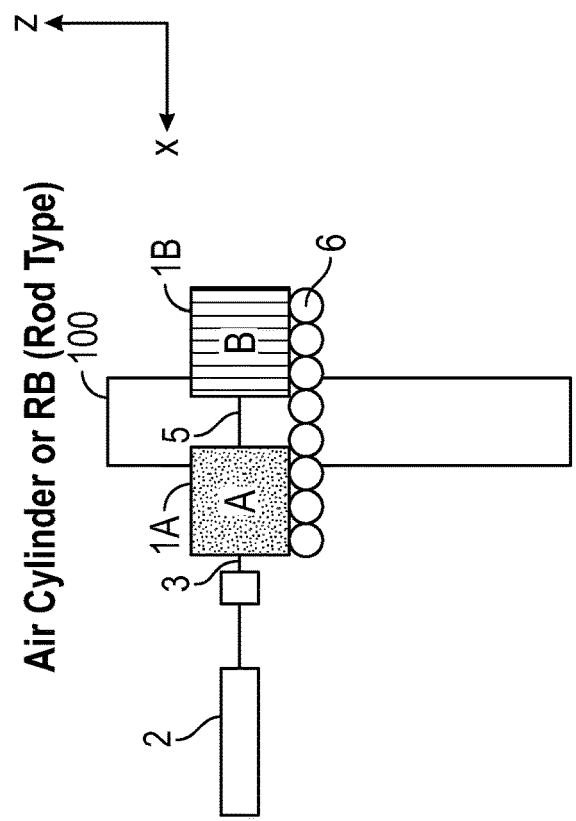
Figure 10C:
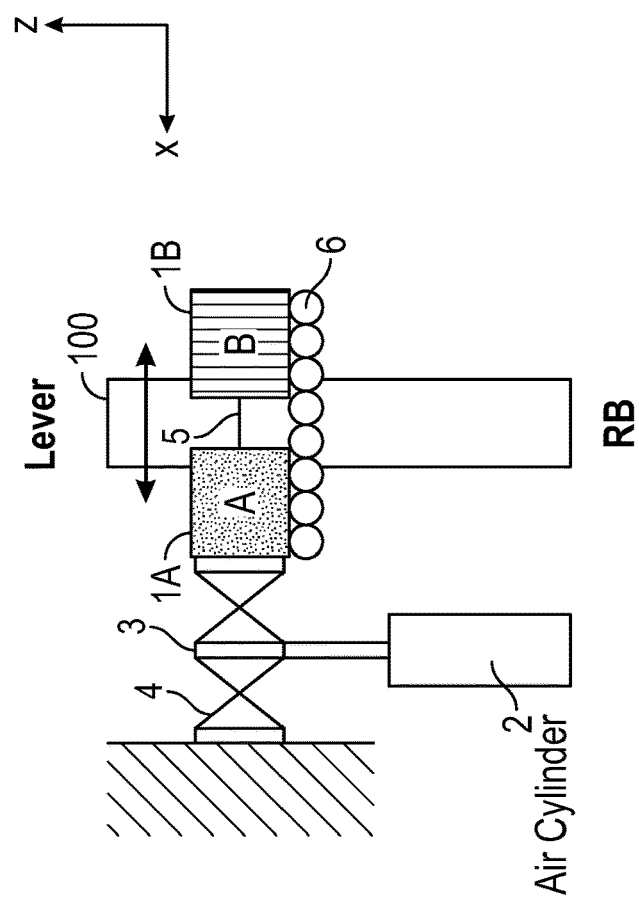
Figure 10E:
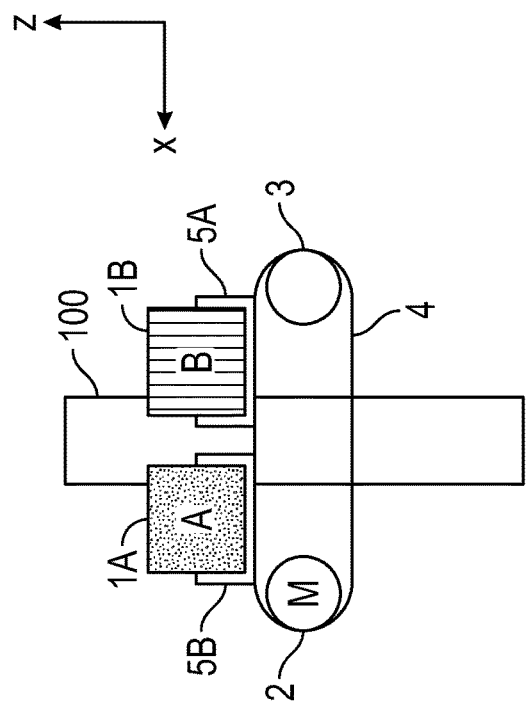

Compared to FIG. 10E with the actuator placed inside the injection molding machine 100, the FIG. 3A configuration has the actuator external to the injection molding machine 100. This enables easier maintenance of the actuator 2. In addition, it can start up the system to move the dies separately from the injection molding machine 100, and thus result in shortening the production schedule.

Figure 10F:
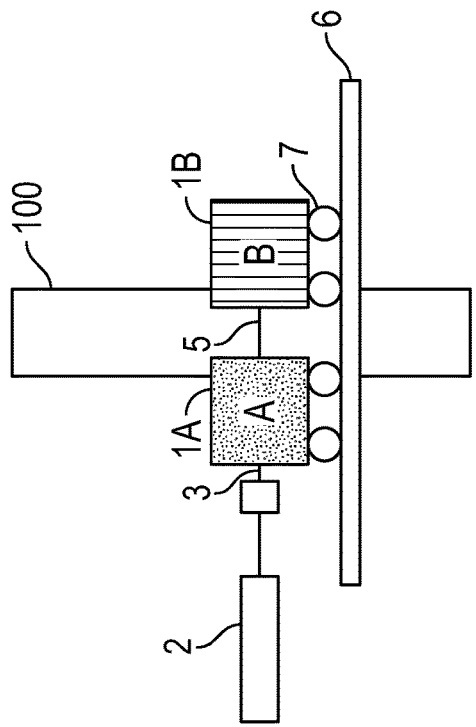

Compared to a mechanism requiring placement of machine parts, such as chain or roller, external to the injection molding machine 100, as in FIG. 10A or FIG. 10F, FIG. 3A includes all the mechanisms to move the dies, except for the free roller external to the injection molding machine 100. This provides for easier maintenance.

FIGS. 3C and 3D both depict the actuator 31 and the linking unit 32, but the distance of Z-axis direction from linked position of linking unit 32 side and actuator 31 side to the actuator 31 differs.

In FIG. 3C, slider 38 is mounted on the actuator 31, and the plate 35 with fabricated slot is mounted on the slider 38.

On the other side, fixed section of the die 33A has the base plate 24, the linked plate 23 and the shaft 22 is assembled, and the cam follower 21 which is rotating body is attached to the tip of the shaft 22, and then the cam follower 21 is inserted into the slot of the plate 35. By moving the slider 38 of the actuator 31 in X-axis direction, the die 33A moves.

It is easier to push when the base plate 24 is mounted on negative side of Z-axis direction from center of the die 33A. Also it is easier to push when the base plate 24 is mounted close as possible to center of Y-axis direction of the die 33A. But the die separates to movable and stationary parts in the Y-axis direction, if the movable and stationary parts are split in center of the die, it cannot mount the base plate 24 at the center of Y-axis direction of the die 33A. When mounting the base plate 24 to stationary parts, it will be better to mount close as possible to movable die in the Y-axis direction.

By moving the die 33A, moving force and stopping force of the die 33A is necessary positive and negative direction of X-axis, and the momentum from working point of the cam follower 21 and the plate 35 becomes load to the actuator 31. Reducing the load from the momentum is important to prevent breakdown of the actuator 31.

The length of momentum is the distance from when a bottom edge of the cam follower 21 contacts the slot on the plate 35 to the top surface of the actuator 31, and it is important to reduce this distance Za. In the configuration illustrated in FIG. 3C, it fastens slotted plate 35 to the actuator 31 side, and by fastening the cam follower 21 to the die 33A side to reduce the distance Za as much as possible, reduces the momentum and reduces the load to the actuator 31.

FIG. 3D illustrates when the cam follower 21 is mounted on the actuator 31 side, and slotted plate 25 is mounted on the die 33A side. To mount the cam follower 21 to the actuator 31 side, it will need to mount a plate 39 to the slider 38 for the cam follower 21, and then mount the cam follower 21 to the plate 39. The slotted plate 25 will be attached to the bottom tip of the shaft 22, and the cam follower 21 is inserted. If the actuator 31 moves in X-axis direction, the die 33A can move. Either the configuration of FIG. 3C or the configuration illustrated in FIG. 3D are applicable as the linking unit of the present embodiment.

In the case of FIG. 3D, a distance of momentum to the actuator 31 becomes a distance Zb, and this distance Zb is longer compared to the distance Za from FIG. 3C for the portion of the plate 39 which increases the momentum, and the load to the actuator 31 is larger than the configuration of FIG. 3C.

A type of an actuator is described below, and in addition to a single axis robot, air cylinder, hydraulic cylinder, linear slider, and motor can be used.

<Detection of Breakage of a Linking Unit>

Figure 4:
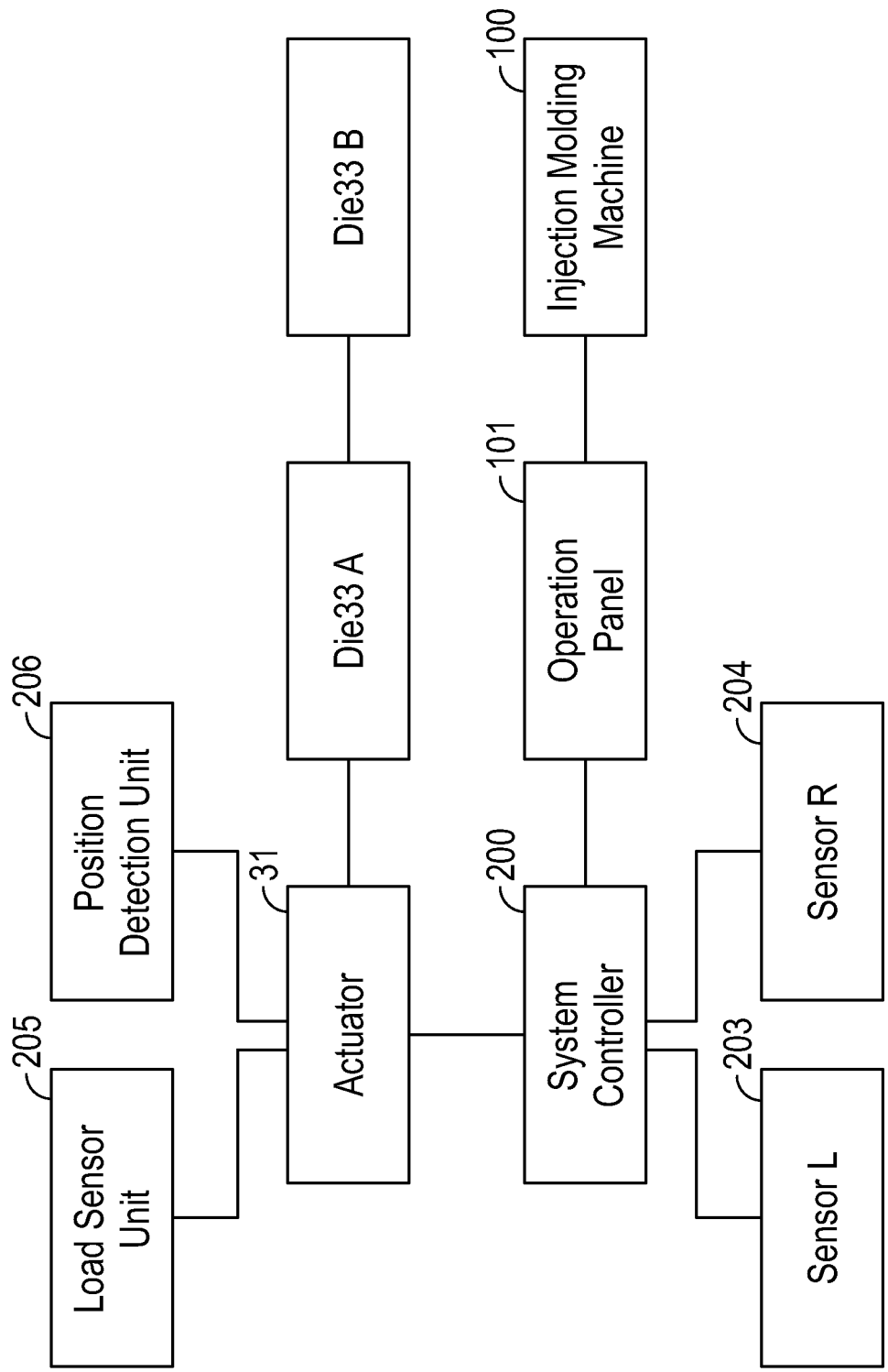
FIG. 4 is a block diagram of an injection molding system.

FIG. 4 illustrates a configuration of this embodiment in a block diagram. The system controller 200 controls the actuator 31 that moves the die 33A and the die 33B, and the operation panel 101 controls the injection molding machine 100. The system controller 200 and the operation panel 101 communicate each other.

Figure 9A:
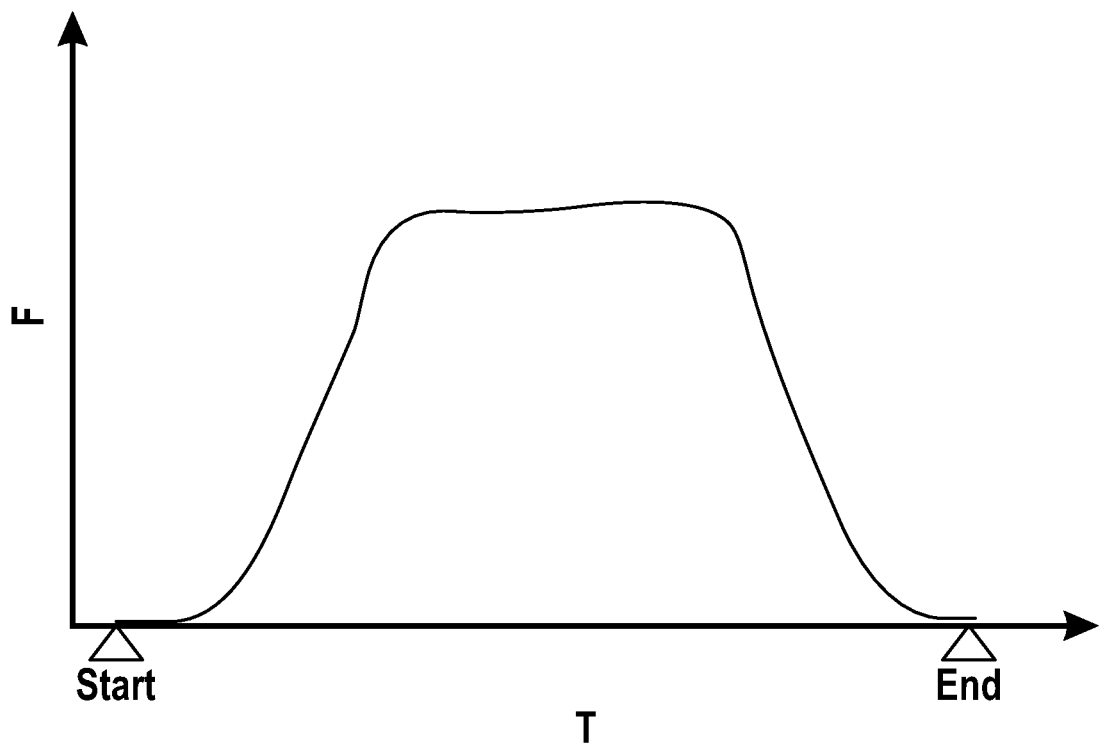
FIGS. 9A-9B are graphs illustrating force applied to an actuator.
Figure 9B:
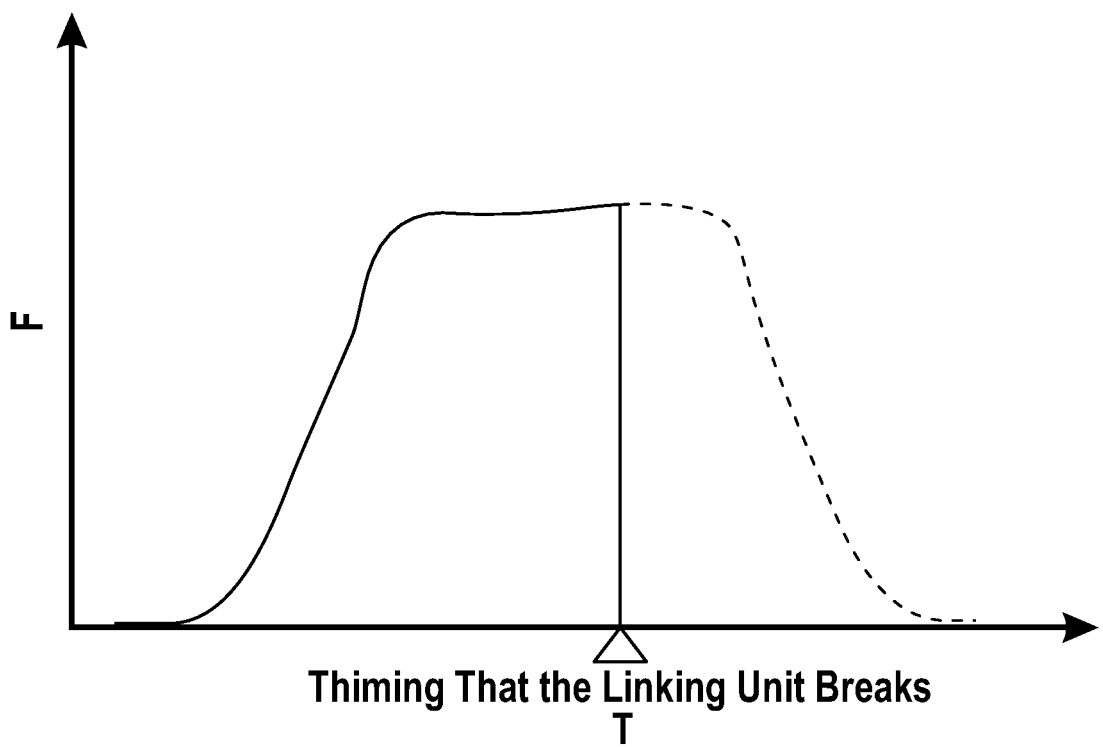

A load sensor unit 205 is installed in the actuator 31 to detect a force applied to the actuator 31. The force applied to the actuator 31 is illustrated in FIGS. 9A and 9B. A vertical axis means the force applied to the actuator 31 and a horizontal axis means a time in FIGS. 9A and 9B. FIGS. 9A and 9B are described in detail below. A position detection unit 206 is installed in the actuator 31 to detect a position of the actuator 31. A sensor L (203) and a sensor R (204) are installed to detect presence of the dies at a specified position within the injection molding machine 100.

FIGS. 5A-5D illustrate examples of failure when the linking unit 32 between the die 33A and the actuator 31 breaks due to fatigue. When there is the failure related to the linking unit 32, the distance between the actuator 31 and the die 33A may become short or long. Even though the actuator 31 tries to move the dies, the die 33A may not follow the actuator 31 and move.

Figure 5A:
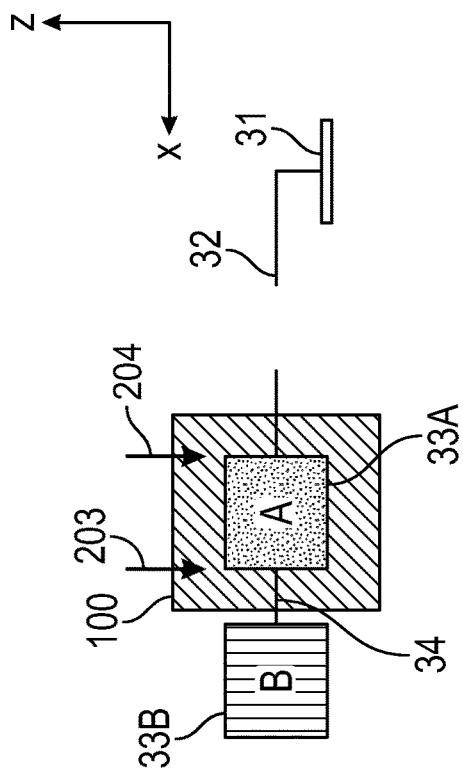
FIGS. 5A-5D are diagrams of examples that a linking unit between a die and an actuator breaks due to fatigue.
Figure 5B:
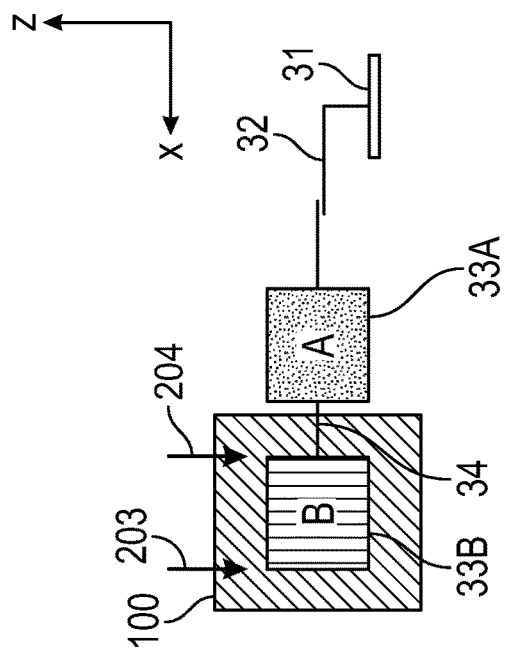

FIGS. 5A and 5B illustrate a situation when an injection operation to the die 33A completes and the die 33B moves to the injection molding machine 100. In FIG. 5A, the actuator 31 and the die 33A are linked by the linking unit 32, and the die 33A and the die 33B are linked by the linking unit 34. In FIG. 5B, the linking unit 32 broke when the dies are moved from the FIG. 5A condition. Because the die 33B and the die 33A cannot move to a specified position, an injection operation cannot be performed to the die 33B.

Figure 5C:
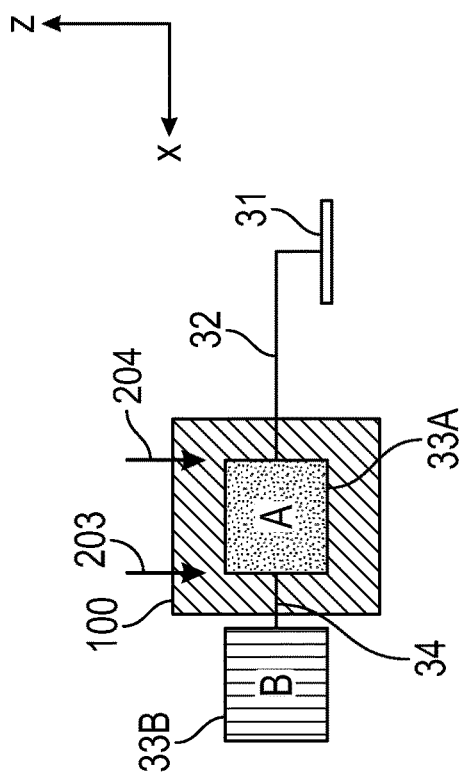
Figure 5D:
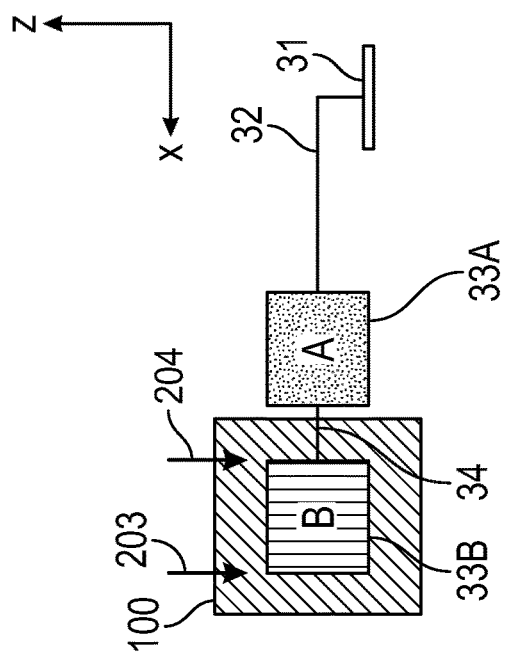

FIGS. 5C and 5D illustrate a situation when an injection operation to the die 33B completes and the die 33A moves to the injection molding machine 100. In FIG. 5C, the actuator 31 and the die 33A are linked by the linking unit 32, and the die 33A and the die 33B are linked by the linking unit 34. In FIG. 5D, the linking unit 32 broke when the dies are moved from the FIG. 5C condition. Because the die 33B and the die 33A cannot move to a specified position, an injection operation cannot be performed to the die 33A.

FIGS. 6A-6D illustrates examples of failure when the linking unit 34 between the die 33A and the die 33B breaks due to fatigue. When there is the failure related to the linking unit 34, the distance between the die 33A and the die 33B may become short or long. Even though the actuator 31 tries to move the dies, the die 33B may not follow the actuator 31 and move.

Figure 6A:
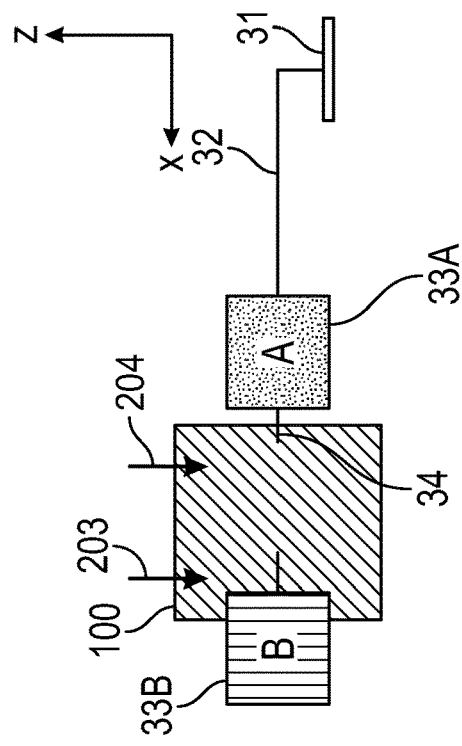
FIGS. 6A-6D are diagrams of examples that a linking unit between dies breaks due to fatigue.
Figure 6B:
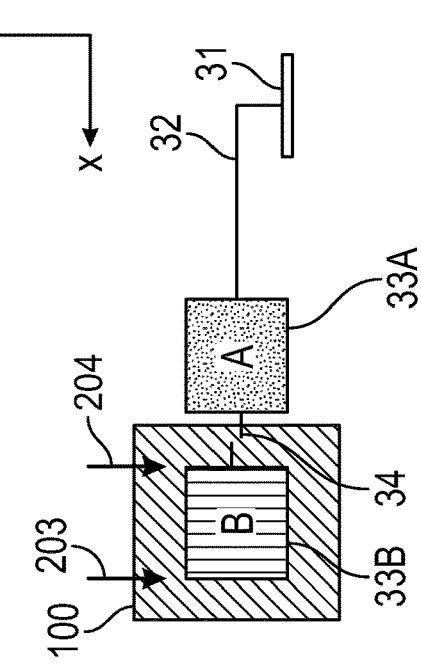

FIGS. 6A and 6B illustrate a situation when an injection operation to the die 33A completes and before the die 33B moves to the injection molding machine 100. In FIG. 6A, the actuator 31 and the die 33A are linked by the linking unit 32, and the die 33A and the die 33B are liked by the linking unit 34. In FIG. 6B, the linking unit 34 broke when the dies are moved from the FIG. 6A condition. Because the die 33B and the die 33A cannot move to a specified position, an injection operation cannot be performed to the die 33B.

Figure 6C:
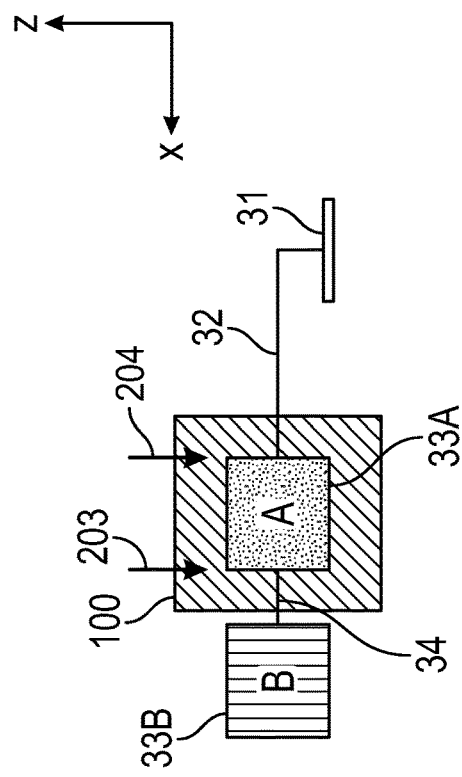
Figure 6D:
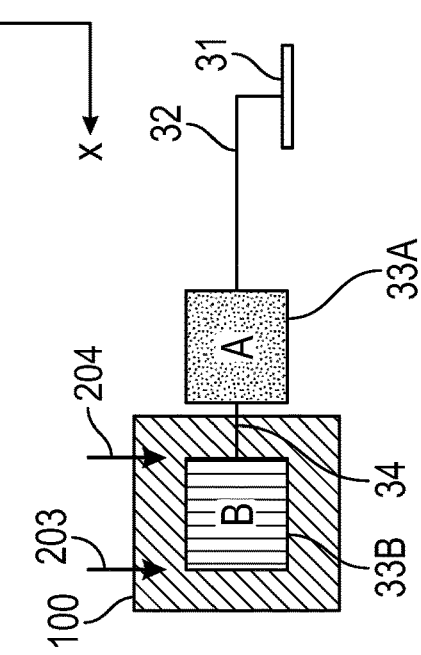

FIGS. 6C and 6D illustrate a situation when an injection operation to the die 33B completes, and before the die 33B moves to the injection molding machine 100. In FIG. 6C, the actuator 31 and the die 33A are linked by the linking unit 32, and the die 33A and the die 33B are linked by the linking unit 34. In FIG. 6D, the linking unit 34 broke when the dies are moved from the FIG. 6C condition. Because the die 33B and die 33A cannot move to a specified position, an injection operation cannot be performed to the die 33A.

Figure 7A:
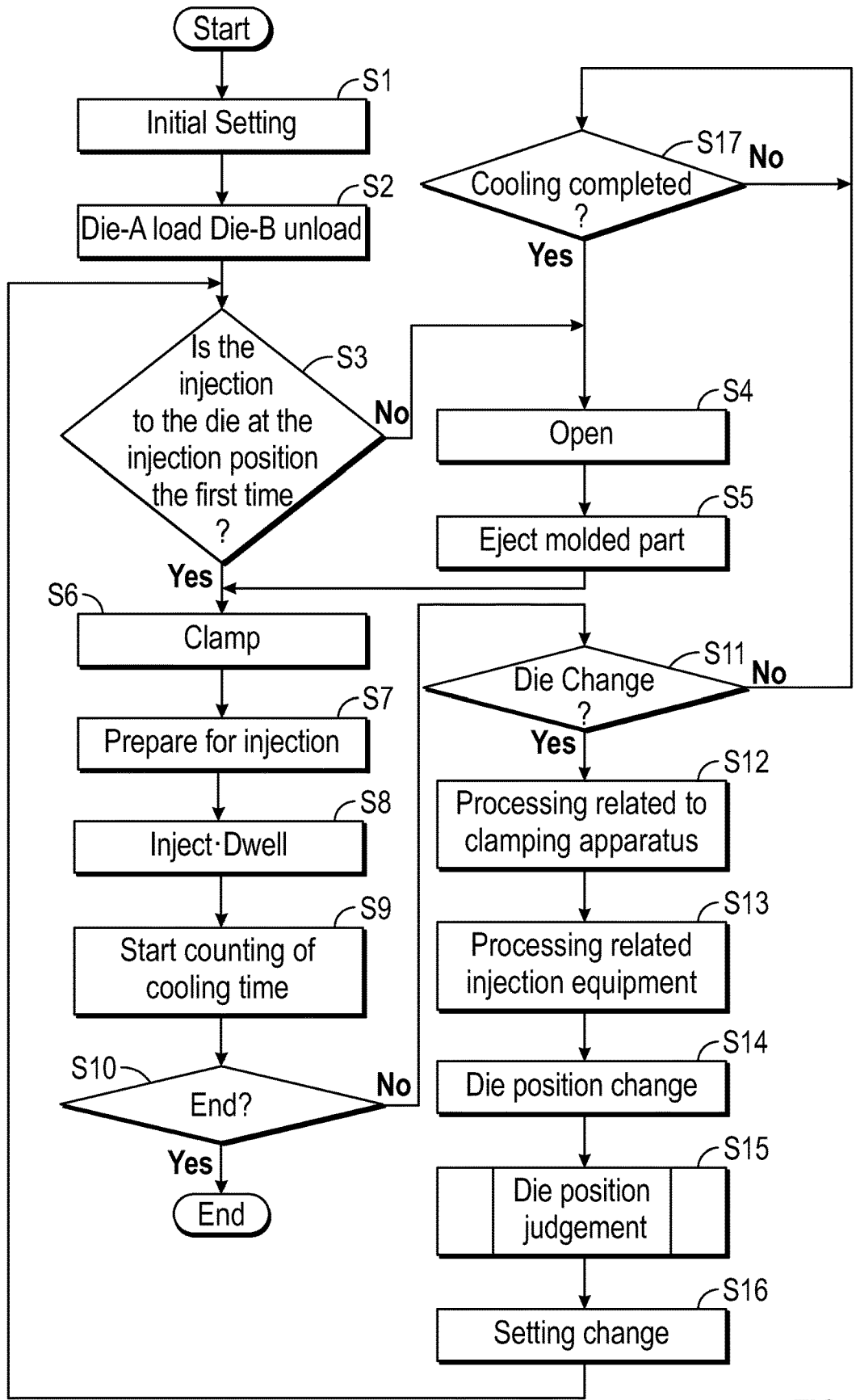
FIGS. 7A-7C are process flow charts of an operation by an injection molding system.
Figure 7B:
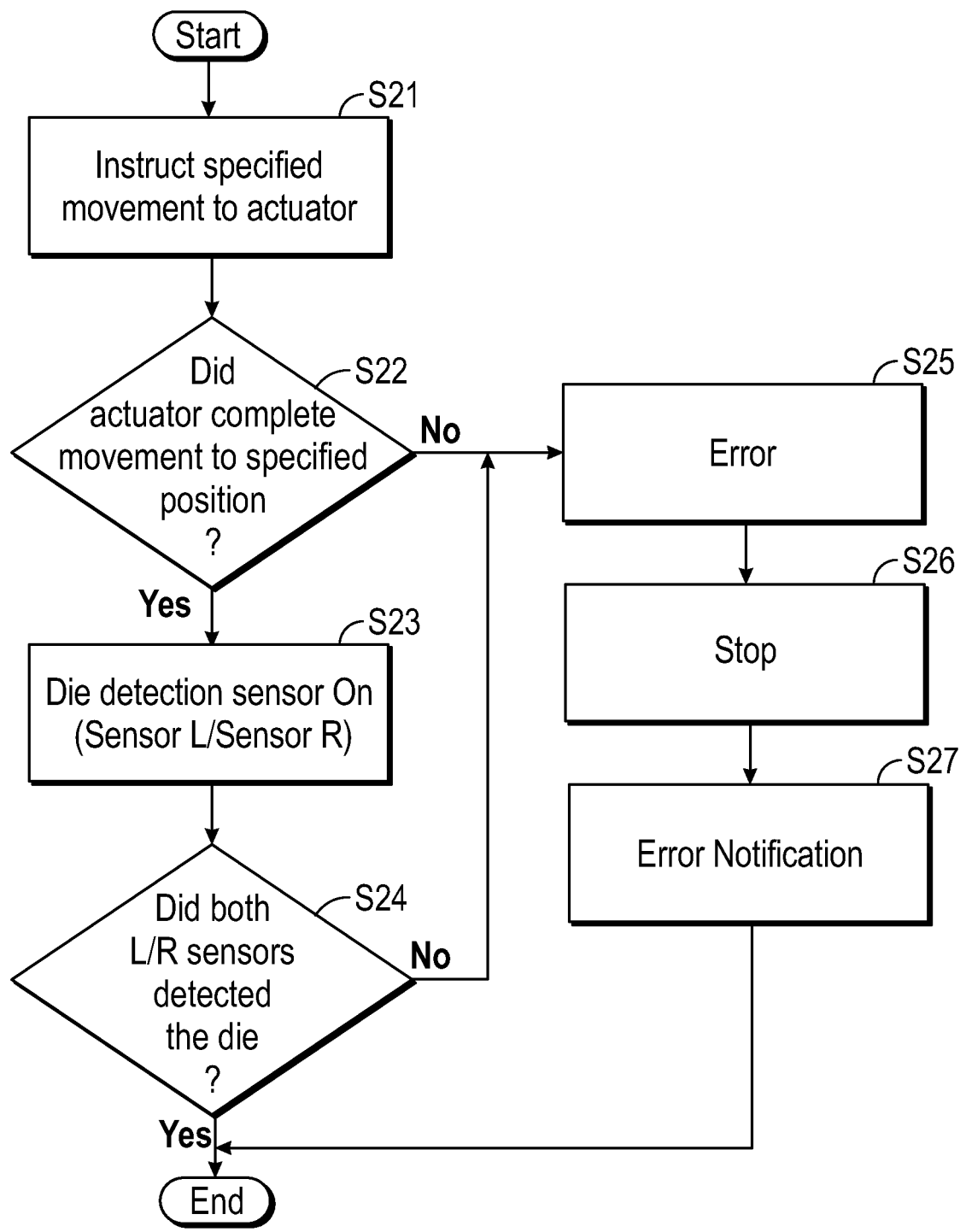
Figure 7C:
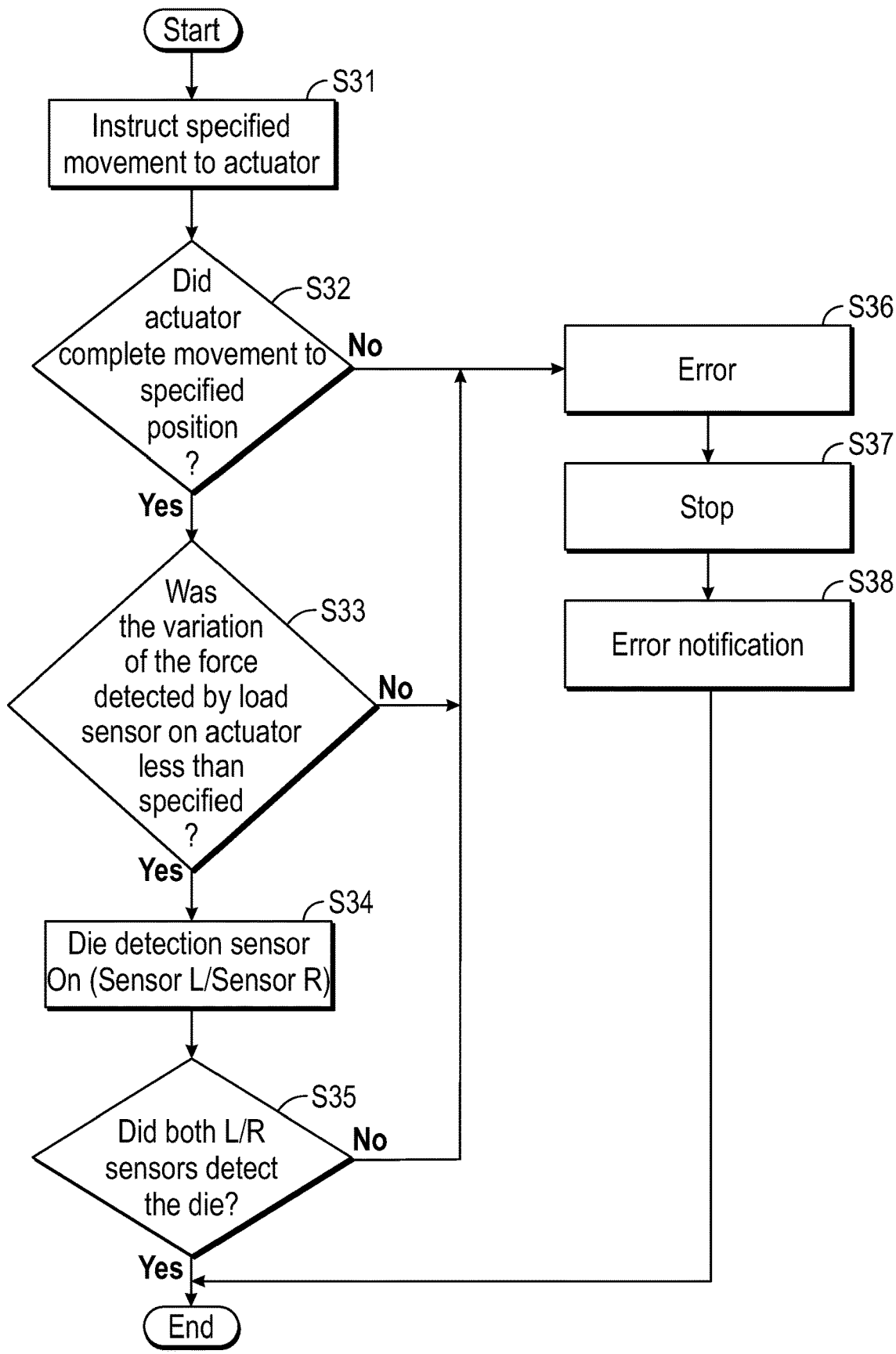

FIGS. 7A-7C illustrate a flow chart of an operation process of the injection molding machine 100 in the present embodiment. The flow charts describe that the injection molding machine 100 starts when the power is on, and the die 33A is at the position1, the die 33B is at the position 2, but this implementation is not seen to be limiting.

In S1, the system controller 200 reads initial setting information, which may be entered by the operator. For example, the initial setting includes a cooling time for the die or the number of molded parts to be generated with each of the dies. The cooling time can be entered by a user, or depending on the characteristic of the die and resin. The system controller 200 can calculate the necessary cooling time based on previously entered information.

In S2, the system controller 200 controls the actuator 31 so that the die 33A moves to the injection position (position 2) and the die 33B moves to the cooling position (position 3). The actuator 31 moves the die 33A from the position1 to the position2, and moves the die 33B from the position2 to the position3. For example, the actuator 31 first moves the die 33A to the injection position, then the injection molding machine 100 injects resin into the die 33A. Then after injecting resin, the actuator 31 moves the die 33A out of the injection position, and simultaneously moves the die 33B to the injection position. In this way, while the die 33A and the resin is being cooled at the position 1, the die 33B can have resin injected at the position 2. At this time, the linking unit 32 between the die A and the actuator 31 and the linking unit 34 between the die 33A and the die 33B includes the cam followers 21 with slippage and the base plate 31 with slots, so the load from misalignment as mentioned above applied to the actuator 31, the linking units, and the dies can be reduced.

In S3, the system controller 200 determines whether the injection to the die at the injection position is the first time. If it is determined that the injection to the die at the injection position is the first time, the system controller 200 proceeds to S6, and if not, the system controller 200 proceeds to S4.

In S4, if the system controller 200 determines the injection to the die at the injection position is not the first time in S3, the system controller 200 controls the injection molding machine 100 to open the die. The die can be opened by the clamps appertain to platens of a stationary and a movable side of the injection molding machine 100 and fixing those platens with the die, and by moving the movable side platen moving backward (+Y direction), the die is opened. Also by opening the die, the injection molding machine 100 can take out the molded parts from the die in the next S5 process.

In S5, the system controller 200 controls the injection molding machine 100 to take out the molded part out of the opened die. As for the molded parts, an auto hand attached to the injection molding machine 100 enters into the gap between the stationary side die (fixed die, fixed part or fixed die) and the movable side die (movable die, movable part or movable die) created by opening the die, then the auto hand holds the molded part by vacuum suction or grabbing the molded part, take out, and places it on a specified table or a belt conveyor. Specifically after the cooling process of the die 33A and the injected resin is completed at the position 1, the die 33A is moved to the injection position (position 2), and the die 33A is opened and the molded part is removed, the injection molding machine 100 can inject resin into the die 33A again. Further, after the cooling process of the die 33B and the injected resin has been completed, the die 33B is moved to the injection position, and the injection molding machine 100 takes out a molded part. In this way, while one of the die and the resin injected into the die are being cooled, the injection molding machine 100 injects resin into the other die. In other words, during a period from injecting the resin into one of the die to taking out the molded parts from the die, the injection molding machine 100 does not leave the die at the injection position to cool off the die and the resin. The injection molding machine 100 can inject resin into the other die, so the injection molding system 300 can efficiently complete the cycle of injecting resin into the die, cooling, and taking out the molded parts.

In S6, the system controller 200 controls the injection molding machine 100 to clamp the die, if in S3 it is determined the injection to the die at the injection position is the first time (in other words, the process proceeds to S3 directly from S2), or the process proceeds to S6 from S5. For clamping the die, the injection molding machine 100 closes the platen on the movable side of the injection molding machine 100, then after the movable-side die and the stationary-side die contact each other, the clamping mechanism of the injection molding machine 100 clamps the die. A cavity is formed between the movable-side die and the stationary-side die.

In S7, the system controller 200 controls the injection molding machine 100 to make an injection nozzle into contact with the die to prepare for the injection. Before moving forward the injection nozzle to the die, the system controller 200 confirms the stationary-side platen and the stationary-side die are clamped together. After moving forward the injection nozzle, the system controller 200 confirms the contact between the injection nozzle and the stationary-side die to check if the injection molding machine 100 is able to inject resin into the die.

In S8, the system controller 200 controls the injection molding machine 100 to inject resin into the die and to keep pressure inside the die. The resin is injected into the cavity and the molded part will be formed at the cavity. Specifically, by following the molding conditions for the die 33A, which is previously saved on the injection molding machine 100, the injection molding machine 100 performs an injection process of injecting resin from the injection nozzle, then performs a pressure holding process to keep pressure applied to the resin from the injection nozzle.

In S9, the system controller 200 starts counting cooling time. The cooling time is counted by a timer circuit and the system controller 200 checks if a predetermined period of the cooling time passes, based on the molding condition for the die 33A, which is previously saved on the injection molding machine 100. The cooling time is, for example, about 10 sec if the resin is ABS, thickness is about 2.0 mm, and the molded part is about the size of printer exterior parts. The cooling time is, for example, about 5 sec if the resin is PS, thickness is about 1.0 mm, and the molded part is about the size of toner cartridge of a printer. But the cooling time varies depending on resin quality, temperature and shape.

In S10, the system controller 200 determines whether an operation in the injection molding machine 100 is completed. The operation ends, for example, when the number of molded parts reaches the predetermined number set by a user, or power is turned off for the injection molding machine 100. If a predetermined operation has been completed, then the process ends, and otherwise the system controller 200 proceeds to S11.

In S11, the system controller 200 determines if the die 33A and the die 33B should be moved. Moving of the dies 33A, 33B will occur if previously saved cooling time for the die 33B is less than twice of previously saved cooling time for the die 33A. But the moving will not occur if previously saved cooling time for the die 33B is twice or more of previously saved cooling time for the die 33A.

Switching the dies after injecting resin does not occur when the previously saved cooling time for the die 33B is twice or more than the previously saved cooling time for the die 33A. On the other hand if that is not the case, the actuator 31 moves the die 33A to the position1, and moves the die 33B to the position2. If it is determined to move positions of the dies 33A, 33B in S11, the system controller 200 proceeds to S12. If not, the system controller 200 proceeds to S17.

In S12, the system controller 200 controls the injection molding machine 100 to open up a little to make the die movable. In this step the injection molding machine 100 releases the clamps attained on the platens of the stationary side and the movable side from the dies, and by giving a small opening about 5 mm, for example, on the movable side platen to make the die movable. The amount of the small opening can be changeable to any of the conditions, as far as the die is movable.

In S13, the system controller 200 controls the injection molding machine 100 to move back the injection nozzle about 10 mm, for example, to make the die movable. This step is to prevent damage to the die and the injection nozzle due to interference between the die and the injection nozzle while the dies are being changed. The amount of the injection nozzle's moving back can be set to any range as far as the interference between the die and the injection nozzle is avoided.

In S14, the system controller 200 starts to control the actuator 31 so that the die 33A moves to the injection position (position 2) and the die 33B moves to the cooling position (position 3), if the die 33B has been at the injection position since the previous step S13. On the other hand, If the die A has been at the injection position, the actuator 31 starts to move the die 33A from the position2 to the position1, and moves the die 33B from the position3 to the position2. During the change of the dies, the linking unit 32 for the die 33A and the actuator 31 and the linking unit 34 for the die 33A and the die 33B include parts with slippage and plates with slot, so the load from misalignment as mentioned above to the actuator 31, the linking units, and the dies can be reduced.

In S15, the system controller 200 detects the position of the die using two sensors inside the injection molding machine 100. These two sensors are detecting presence of the die when the die comes to the injection position inside the injection molding machine 100 by seeing if the edge of the die is in the position to be. Also, the sensors are installed above the die in a state where the sensors face down toward the top of the die. Compared to the other configuration, it is harder to get dirt such as dust, and it is more convenient to install the sensors in the injection molding machine 100. For the placement of the sensor, if both sensors are placed near center of the injection molding machine 100 or outside of the injection molding machine 100, then it wouldn't correctly detect the position of the die. Also, it's necessary to consider slight shifting and the size of the die, the sensors should be placed slightly inside from the edge of the die. That is, the sensors may be placed at positions according to the smallest die which the injection molding machine 100 can handle. These two sensors are to check the die 33A and the die 33B are linked, check the position of the actuator, and check the correct positions of the two dies. If one sensor is placed at the center of the injection molding machine 100, it only detects the die is below the sensor, and cannot detect if the die is at a correct position. After the instruction to move the dies is issued in S14, the system controller 200 proceeds to the die position determination process in S15. The die position determination process is described below with reference to FIG. 7B.

In S16, the system controller 200 changes setting to the condition set for the die in the position 2. The condition set for die 33B, for example, applying to the die 33B is loaded from a memory of the system controller 200 or the injection molding machine 100. If in step S14 the die in the position 2 is changed from the die 33A to the die 33B, the system controller 200 changes from the settings for the die 33A to the settings for the die 33B. The system controller 200 changes setting such as injection condition, holding pressure, and cooling condition.

In S17, the system controller 200 determines if the cooling time has elapsed. If the system controller 200 determines the cooling time has completed, the system controller 200 proceeds to S4. If not, the system controller 200 waits until the cooling time elapses.

FIG. 7B illustrates a die position determination process. The die position determination process is a process to determine if the die has moved to the injection molding machine 100 after the instruction to move the die was done in S14 in FIG. 7A.

In S21, the system controller 200 instructs specified movement to the actuator 31. The actuator 31 includes a position detection system that is the position detection unit 206. The position detection unit 206 recognizes any specified position previously set.

In S22, the system controller 200 determines if the actuator 31 completed movement to the specified position. The determination in S22 is performed by the position detection unit 206. The position detection unit 206 can detect about how much die moved according to the position of the actuator 31. As states of the die position, there are two states. As illustrated in FIG. 3A, one state is that the die 33A is at the position1 and the die 33B is at the position2, and second state is that the die 33A is at the position2 and the die 33B is at the position3. The actuator 31 moves the dies as switching between those two states. The position detection unit 206 detects if movement from one position to the other position has completed. Therefore, the position detection unit 206 detects movement of the die 33B from the position2 to the position3 (the die 33A from the position1 to the position2) in the X-axis positive direction in FIG. 3A, or movement of the die 33B from the position3 to the position2 (the die 33A from the position2 to the position1) in the X-axis negative direction in FIG. 3A. The above-described movement will be called in FIG. 7 as movement to specified position. In other words, the system controller 200 executes a conveying operation.

If the system controller 200 determines that the actuator 31 completes movement to the specified position (the conveying operation is finished), the system controller 200 proceeds to S23. If not (the conveying operation is not finished), the system controller 200 proceeds to S25. For example, if malfunction occurred to the actuator 31, e.g., drive unit is caught during move or pinched something, the system controller 200 will determine as NO.

In S23, the system controller 200 instructs the sensors to check the presence of the die Both sensor L203 and sensor R204 are turned on at the same time to enable detection. Sensors L203, R204 can always be turned on. If the sensor was turned on in S23, the sensor will be turned off after S24.

In S24, the system controller 200 checks both the sensor L203 and the sensor R204. If both sensors detect the die, the system controller 200 determines the die is at the correct position and completes process, and proceeds to S16 in FIG. 6. If both sensors do not detect the die, the system controller 200 proceeds to S25.

In S25, the system controller 200 triggers error as the reason that S22 or S24 did not satisfy the requirement.

In S26, the system controller 200 triggers stop instruction to the injection molding machine 100 and the actuator 31. By this stop instruction, the injection molding system 300 will stop and prevent damage to the dies or devices. In a case in which the system controller 200 determines the conveying operation is not finished in S23, the system controller 200 stops the current conveying operation immediately. In this case, the die 33A will be stopped at a position between the position 1 and the position 2, and the die 33B will be stopped at a position between the position 2 and the position 3. In a case in which both sensors (the sensor L203 and the sensor R204) do not detect the die in S24, the system controller 200 prohibits the next conveying operation. In this case, the current conveying operation is finished, so the die 33A will be stopped at either the position 1 or the position 2, and the die 33B will be stopped at either the position 2 or the position 3.

In S27, the system controller 200 sends error notification to the injection molding machine 100 and the actuator 31.

Using this error notification, the system controller 200 communicates to an operator, and the operator can find the cause of the error, and the operator can perform maintenance. Also, rather than the operator, it can notify to a robot that performs maintenance, and the robot can detect the cause of the error with a camera. In this case, depending on the position of the die, the robot can understand if the linking unit needs replacement or if the die needs maintenance, and the maintenance can be performed by the robot.

In FIG. 7B, detection of moving distance by the actuator 31 and detection of the dies by the sensors L203, R204 was done, but it can detect force applied to the actuator 31 as illustrated in FIG. 7C. That is, when the dies are moved, heavy load is applied to the actuator 31 and parts linked to the actuator 31. The die 33A through linking unit 32 and the die 33B through linking unit 34 are connected to the actuator 31. As illustrated in FIG. 9A, when the die starts to move, the actuator 31 tries to move the die and large load occurs. When the die moves and keeps at a stable speed, load will maximize and settle. When the die approaches the specific position, deceleration begins and load decreases. When the die reaches the specified position, load becomes zero.

This relation between load of the die and the time is always same because the same output of actuator 31 drives the same weight dies. However, if one of the linking units disconnects during movement, the load suddenly decreases, and output of the actuator 31 becomes as illustrated in FIG. 9B. FIG. 9B illustrates when the linking unit 32 between the actuator 31 and the die 33A breaks. By detecting this sudden variation in force, it can determine one of the linking units is broken. There are some variations in force when the dies are moved, so the system controller 200 determines if the variation in forces by the actuator 31 is less than a specified force.

FIG. 7C illustrates another example of a die position determination process. S31-32 in FIG. 7C are the same as S21-22 in FIG. 7B, while S34-38 in FIG. 7C are the same as S23-S27 in FIG. 7B respectively. In S33 in FIG. 7C, the system controller 200 detects the force on the actuator 31 by using the load sensor unit 205 when the dies are moved, and detects if the variation of the force to the actuator 31 is less than specified. If the system controller 200 determines that the variation of the force is less than specified load, the system controller 200 proceeds to S34. If the system controller 200 determines that it is above the specified load, possibility that breakage of the linking units 32, 34 is high, and the system controller 200 proceeds to S36.

Even if the variation of force to the actuator 31 is above the specified in S33, the system controller 200 can proceed to S34 and furthermore detects the position of the die by sensors.

In the case that the linking unit 32 breaks down like illustrated in FIG. 5A-B, the die cannot be detected by the sensor L203 in above flow S24, so the system controller 200 determines that the die movement hasn't completed.

In the case that the linking unit 32 breaks down like illustrated in FIG. 5C-D, the die cannot be detected by the sensor R204 in above flow S24, so the system controller 200 determines that the die movement hasn't completed.

In the case that the linking unit 34 breaks down like illustrated in FIG. 6A-B, the die cannot be detected by the sensors L203, R204 in above flow S24, so the system controller 200 determines that the die movement hasn't completed.

In the case that the linking unit 34 breaks down like illustrated in FIG. 6C-D, the die cannot be detected by the sensors R204 in above flow S24, so the system controller 200 determines that the die movement hasn't completed.

Figure 8A:
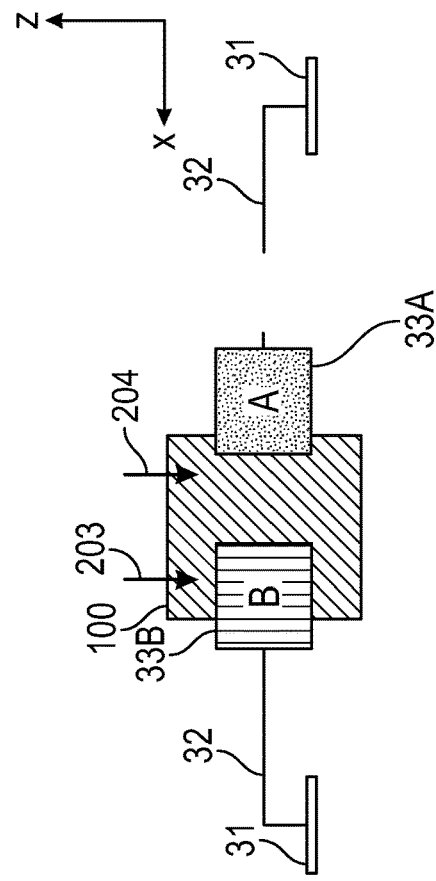
FIGS. 8A and 8B are diagrams of examples that an injection molding system includes two actuators.
Figure 8B:
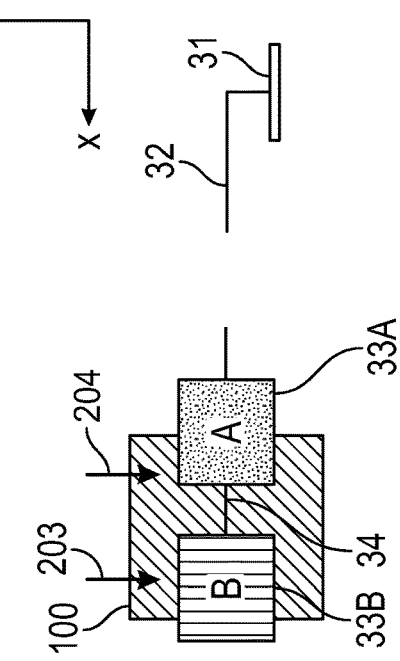

The movements of the dies illustrated in FIG. 5-7 are applicable for two actuators. FIG. 8A-B illustrate when the linking unit 32 between the die 33A and the actuator 31 breaks down in a case of two actuators. If the linking unit 32 breaks down, the sensor R204 cannot detect the die in S24, so the system controller 200 determines that the die movement has not completed. In this way, even in the case of two actuators, the system controller 200 can determines if the die movement has completed.

Figure 8C:
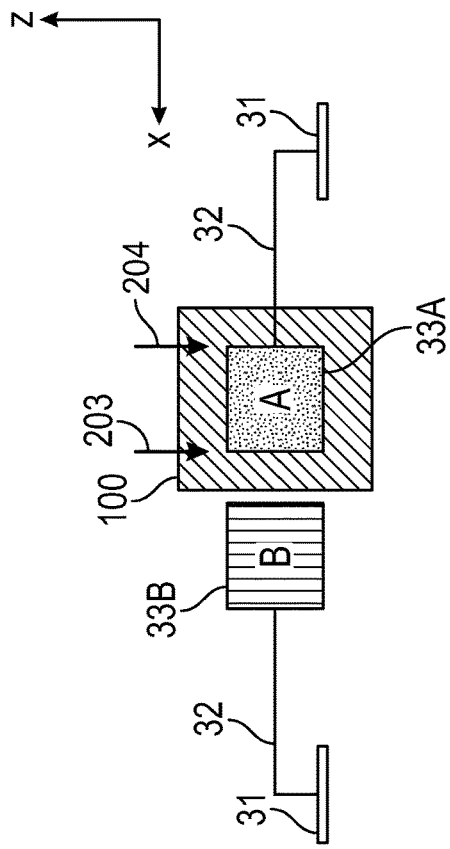
FIGS. 8C-8D are diagrams of examples that an injection molding system includes sensors that detect a die is absent.
Figure 8D:
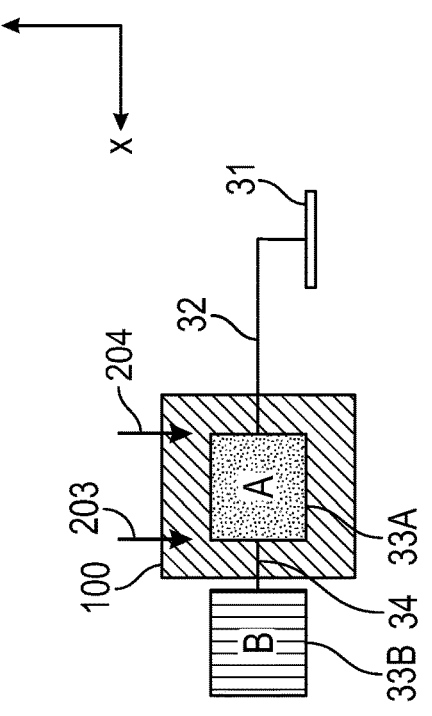

FIGS. 5A-5D, 6A-6D, 7A-7C and FIGS. 8A and 8B illustrate examples that the sensors L203, R204 detect that the die is present, but the sensors can detect that the die is absent. In FIG. 8C-D, when the sensors L203, R204 detect that the die is absent, the system controller 200 determines that the die has completed its movement (moved to the specified position). If the linking unit 32 breaks down and the die cannot move to the specified position, the die may remain near the exit of the injection molding machine 100. Therefore, if the linking unit breaks down, the die is present at a position where the die supposed to be absent. Therefore, if either of the sensors L203, R204 detects the dies, the system controller 200 can determine the die movement has not completed. In this way, the sensors can be sensors which detect that the die is absence.

Figure 8F:
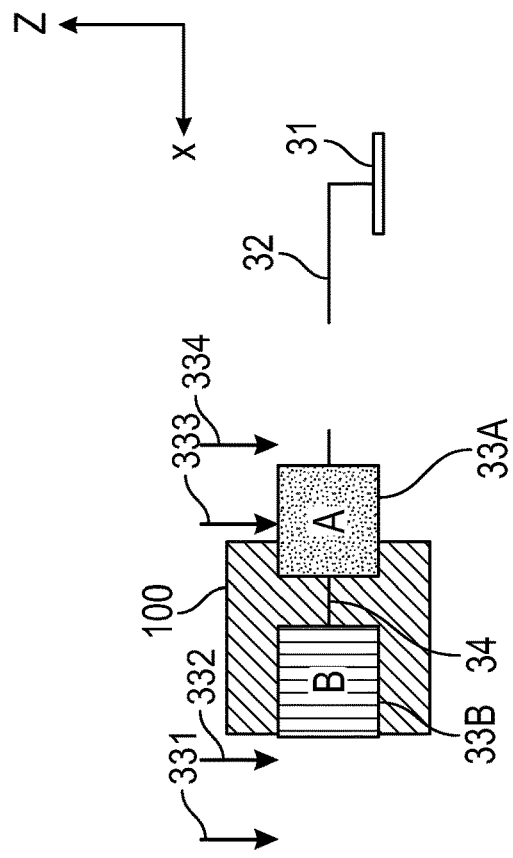
FIGS. 8E-8F are diagrams of examples that an injection molding system includes sensors that are located external to an injection molding machine.
Figure 8E:
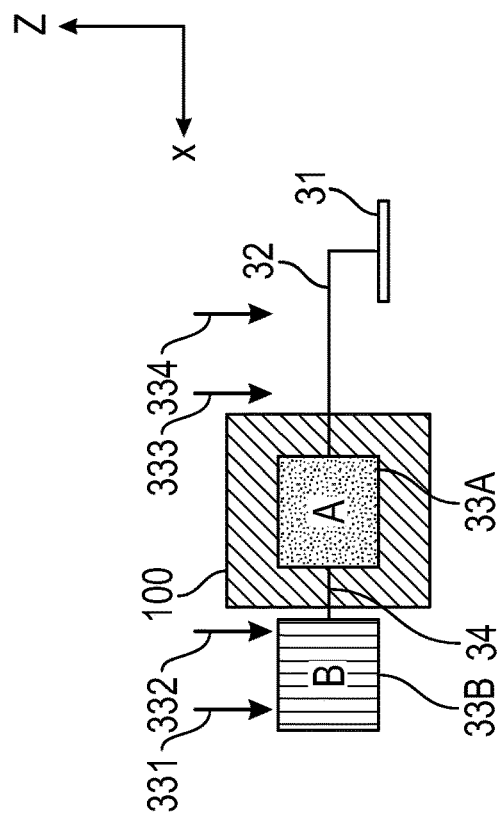

FIGS. 5A-5D, 6A-6D, 7A-7C and FIGS. 8A-8D illustrate examples that the sensors L203, R204 are located at the inside of the injection molding machine 100, but the sensors can be located at the outside of the injection molding machine 100. In FIG. 8E-F, there are four die detection sensors, and sensors 331 and 332, sensors 333 and 334 are paired respectively. If the sensors 331/332 detect the die, and if the sensors 333/334 do not detect the die, the system controller 200 determines that the dies are at correct positions (this state is illustrated in FIG. 8E). If the linking unit 32 breaks down, the sensors 331/332/334 do not detect the die and only the sensor 333 detects the die, the system controller 200 determines that the dies are not at the correct positions (this state is illustrated in FIG. 8F). In this way, the sensors can be located at the outside of the injection molding machine 100.

The system controller 200 performs S24 after S22 in FIG. 7B, and S35 after S32 in FIG. 7C. In this case, if the movement of the actuator 31 has not completed, the system controller 200 will not detect the dies by the sensors. By checking the completion of the movement of the actuator 31 first, the system controller 200 does not need to repeat detection of the dies by the sensors. However, the order of S22 and S24 in FIG. 7B, S32 and S35 in FIG. 7C can be reversed.

Without using the sensors L203, R204, the system controller 200 can determine if the movement completed from only the determination in S32 and S33 and without the determination in S35 in FIG. 7C.

Figure 11:
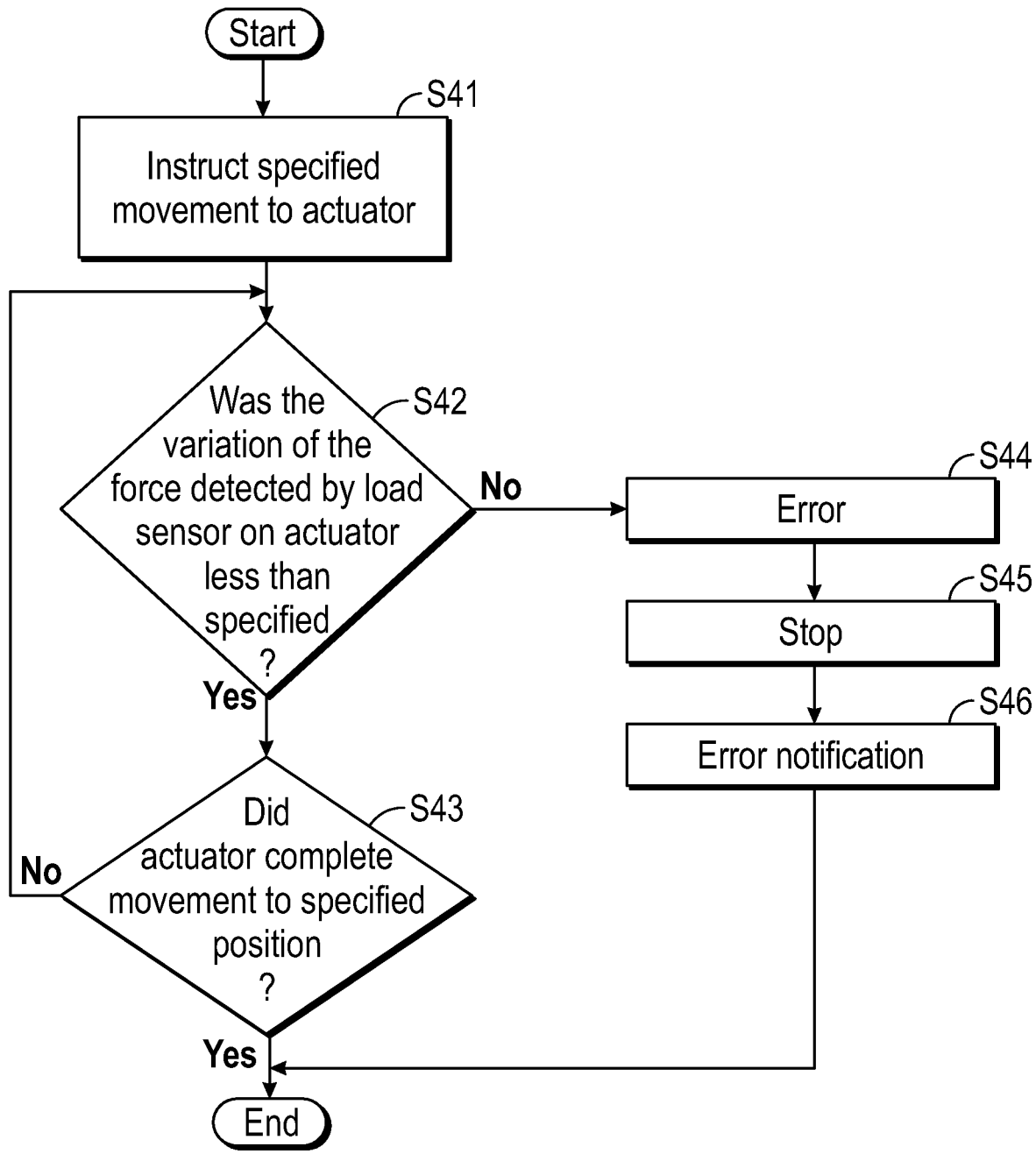
FIG. 11 illustrates another process flow chart of an operation by an injection molding system.

FIG. 11 illustrates another flowchart of the die position determination that uses the load sensor unit 205 and the position detection unit 206 without using the sensors L203 and R204. The flowchart illustrated in FIG. 11 is executed by a CPU in the system controller 200 based on a program stored in a memory.

In S41, the system controller 200 instructs specified movement to the actuator 31.

In S42, the system controller 200 detects the force on the actuator 31 by using the load sensor unit 205 when the dies are moved, and detects if the variations of the force to the actuator 31 is less than specified load. If the system controller 200 determines that the variation of the force is less than specified load, the system controller 200 proceeds to S43. If the system controller 200 judges that it is above the specified load, possibility that breakage of the linking units 32, 34 is high, and the system controller 200 proceeds to S44.

In S43, the system controller 200 determines if the actuator 31 completed movement to the specified position. The determination in S43 is performed by using the position detection unit 206. If the system controller 200 determines that the actuator 31 completed the specified movement, the flowchart ends. If the system controller 200 determines that the actuator 31 has not completed the specified movement, the system controller 200 proceeds to S42. That is, the system controller 200 detects the breakage of the linking units 32, 34 in real time by the load sensor unit 205 while the dies are moved.

In S44, the system controller 200 triggers error as the reason that S42 did not satisfy the requirement.

In S45, the system controller 200 triggers stop instruction to the injection molding machine 100 and the actuator 31. The stop instruction causes the injection molding system 300 to stop, which prevents damage to the dies or devices.

At S46, the system controller 200 sends error notification to the injection molding machine 100 and the actuator 31.

As described above, in FIG. 11, the system controller 200 detects the breakage of the linking units 32, 34 in real time while the dies are moved. With this, for example, in a case where the linking unit 32 breaks while the die 33A is moved into the injection molding machine 100 in FIG. 5C, D, the actuator 31 stops the movement immediately. Therefore, it can reduce the possibility that the broken linking unit 32 crashes with the die 33A.

The system controller 200 performs the determination process at S43 based on the detection result of the position detection unit 206. However, it is not limited to this. For example, the system controller 200 can measure an elapsed time since the actuator 31 starts to move the dies by using a counter installed in the system controller 200. The system controller 200 can finish the die position determination at the timing that the elapsed time reaches a threshold time. The threshold time is set based on a driving speed of the actuator 31, a distance between the injection position and the cooling position, or a weight of the die. That is, the system controller 200 can detect the breakage of the linking units 32, 34 without using the load sensor unit 205 and the position detection unit 206 (an actuator detection unit).

The flow charts illustrated in FIGS. 7A-7C, and FIG. 11 are performed by the system controller 200 in the above embodiment. However, the flow charts illustrated in FIG. 7A-7C, FIG. 11 can be performed by a controller provided at the injection molding machine 100, such as the operation panel 101.

<Detailed Description of Sensor State>

Detailed procedures of changing dies with respect to the injection molding machine 100 will be described with reference to FIGS. 12A-12E. The components and the items of information with the same reference numbers described above are essentially the same components as the above-described items, except as otherwise described below.

In FIGS. 12A-12E, the die 33A is connected to the slide actuator 31 with the joint (connection member) 32, the dies 33A and 33B are connected to each other with the joint (connection member) 34.

The actuator 31 moves the joint 32 and dies 33A and 33B connected to the joint 32. When the slider 38 of the actuator 31 as illustrated in FIG. 3B is at the $1^{st}$ position, the die 33A is supposed to be at the position 1 and the die 33B is supposed to be at the position 2. When the slider 38 is at the $2^{nd}$ position, the die 33A is supposed to be at the position 2 and the die 33B is supposed to be at the position 3. In order words, in a case where the actuator moves the slider 38 from the $1^{st}$ position to the $2^{nd}$ position, the die 33B is supposed to be conveyed out of the position 2 to the position 3, and the die 33A is supposed to be conveyed into the position 2 from the position 1. In a case where the actuator moves the slider 38 from the $2^{nd}$ position to the $1^{st}$ position, the die 33A is supposed to be conveyed out of the position 2 to the position 1, and the die 33B is supposed to be conveyed into the position 2 from the position 1. In order for the system controller 200 to confirm that dies 33A and 33B are correctly conveyed, the sensors 203-206 are provided and the system controller 200 monitors or checks the states of each of the actuator 31, the die 33A and the die 33B.

The sensor 203 (or, the sensor L) and the sensor 204 (or, the sensor R) are located in the injection molding machine 100, the sensor 203 is located on the left (or the table 301B's side) and the sensor R is located on the right (or the table 301A's side). Each of the sensors 203 and 204 is, for example, an optical sensor that includes a light emission member and the light detecting member to receive the light emitted from the light emitting member, and has a detecting position defined by the path of the emitted light for detecting an object located at the detecting position, as illustrated in FIGS. 12 and 13 with arrows extended from the sensors 203 and 204. The sensors 203 and 204 are located close to the left and right edges of one of the dies 33A and 33B, respectively, when the one of the dies is at the injection position 2.

Because variety of dies with different sizes can be used in the injection molding machine 100, the distance between the detecting positions of the sensors 203 and 204 can be designed based on a die with a minimum width in an X direction (a conveying direction of the dies or a direction vertical or transversal to the clamping direction of the injection molding machine). The detecting positions of the sensors 203 and 204 are located so that they do not detect the joint 34 even when one of the detecting positions is between the dies 33A and 33B. In the XY plane, the positions should not overlap with the region of the joint 34 throughout the movement of the dies 33A and 33B. For example, in XY plane, the detecting positions are closer to the fixed platen or movable platen than the joint 34 is to the fixed or the movable platen.

In FIG. 12A-12E, the condition Y for the sensors 203 or 204 means that the sensor detects or is supposed to detect an object. The condition N means that the sensor does not detect or is not supposed to detect an object.

The position detection unit (or the position sensor) 206 can be a linear encoder to detect the position of the joint 32. The system controller 200 is connected to the position sensor 206. The position sensor 206 repeatedly detects the position of the joint 32, and the system controller 200 determines that the joint 32 and the dies 33A and 33B are moving or are stopped. Instead of the system controller 200 determining the dies' movement, an additional sensor can be provided in the injection molding machine 100 to detect whether the dies are moving.

The situation transitions from FIG. 12A, 12B, 12C, 12D to 12E in this order, when the die 33A is conveyed out of the position 2 and the die 33B is conveyed into the position 2. The chart in each of FIGS. 12A-12E indicates states that the dies and the actuator should be in when the corresponding situation occurs. Therefore, if the states do transition from states as illustrated in FIG. 12A through FIG. 12E, the system controller 200 determines that the dies are correctly conveyed and there should be no issues or malfunctions. But if the states do not transition as illustrated in FIG. 12A through 12E, the system controller 200 determines that the dies are not correctly conveyed and the system controller 200 prohibits the actuator 31 to move the joint 32, in other words, the system controller 200 does stop the actuator 31. This process prevents the dies and other components from being damaged from possible abnormal movement of the dies 33A and 33B, the joints 32 and 34, and the actuator 31, and operators from being hit by components moving abnormally. Or, this process at least greatly reduces possibilities of these situations.

Additionally or alternatively, the system controller 200 can issue an alert, if the dies are determined as not correctly conveyed. The alert can be issued by sounding a buzzer or by causing the operational panel 100 or the console 200 to display an error message or an icon for notifying operators of an occurrence of an issue.

When the die 33B is conveyed out and the die 33A is conveyed in, the states transitions in the reverse order from FIG. 12E, 12D, 12C, 12B to FIG. 12A.

Figure 12B:
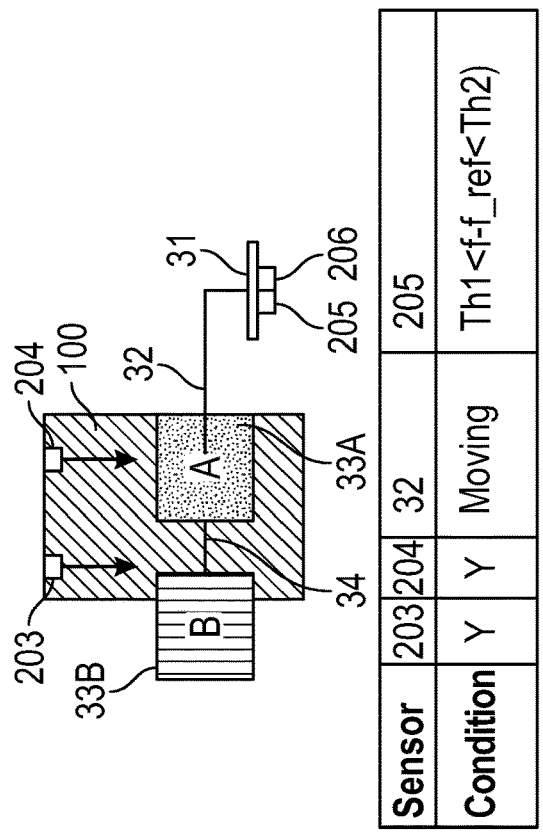
FIGS. 12A-12E illustrate situations where one die is conveyed out of the injection position and then the other die is conveyed into the injection position, according to an exemplary embodiment.
Figure 12D:
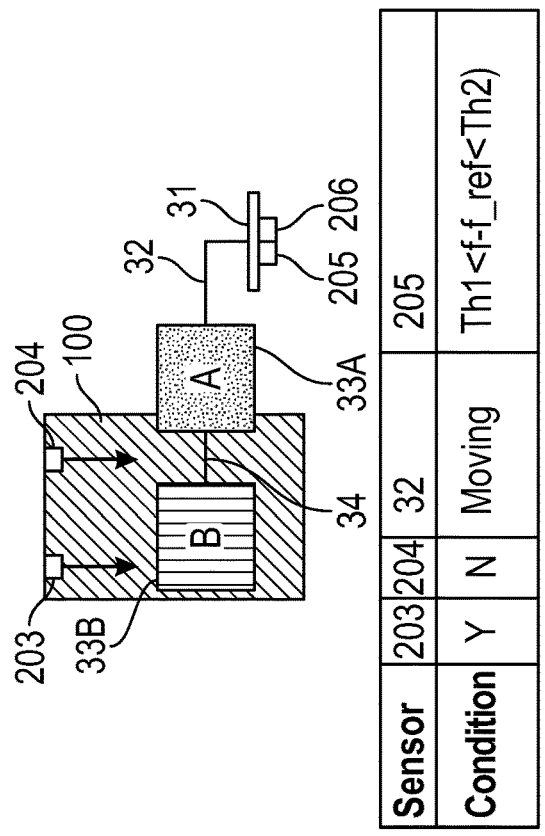
Figure 12A:
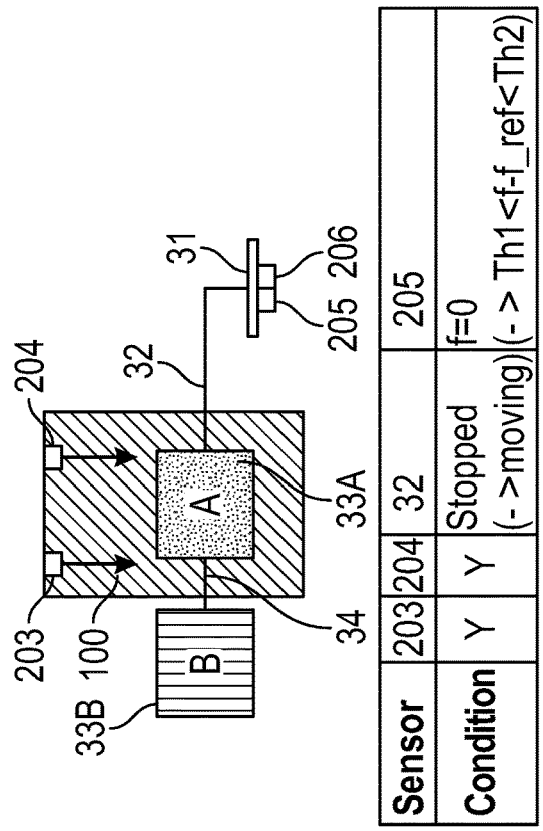

FIG. 12A illustrates the situation where the die 33A is at the position 2 (injection position) in the injection molding machine 100, and the die 33B is at the position 3 (cooling position for the die 33B) on the table 301. In the situation of FIG. A, both the sensor 203 and 204 are supposed to detect the dies 33A and 33B, and movement of the dies 33A and 33B is not supposed to be detected. In other words the dies 33A and 33B are stopped. Also, the force f applied to the actuator 31 is supposed to be 0 or a value indicating that the slider 38 is static. In response to the system controller 200's confirmation of the states of dies and the joint 32 as described above, the actuator 31 can move the joint 32 to convey the die 33A out of position 2 to the position 1 (cooling position for the die 33A) and the die 33B into the position 2 from the position 3. In response to a trigger from the operator's input via, for example, a switch on the console 200, the actuator 31 starts moving the joint 32.

If the states of the dies 33A and 33B and the actuator 31 are not like the states illustrated in FIG. 12A, the system controller 200 prohibits the actuator 31 from starting the movement, and issues an alert.

After the operator's input the condition or the state of the joint according to the sensor 206 is supposed to be changed to 'moving' from 'stopped'. Also, the force f applied to the actuator 31 is supposed to be in a range including f_ref. The f_ref can be defined by the reference curve of the force applied to the joint 32, as illustrated in FIG. 9A. The range can be defined as, for example, $f\_ref+Th1 < f < f\_ref+Th2$, where the Th1 and Th2 define the minimum and the maximum of (f−f_ref), respectively. If the changes of the states of the actuator 31, including the load applied to the actuator 31 and the movement state of the actuator 31 are not detected from the sensors 205 and 206 even after a certain time period has passed since the actuator 31A is started, the system controller 200 stops the actuator 31 and issues an alert as described above.

FIG. 12B illustrates the situation where the die 33A is moving from the position 2 to position 1, and the die 33B is moving from the position 3 to the position 2. In the situation of FIG. 12B, the detecting position of the sensor 203 is located between the dies 33A and 33B. In this situation of FIG. 12B, the sensor 203 is not supposed to detect a die, whereas the sensor 204 is supposed to detect the die 33A. The position sensor 206 is supposed to output different values every time, indicating that the joint 32 is moving. The force applied to the actuator 31 should be the range as described above with reference to FIG. 12A.

If the states of the sensors 203-206 transition from the states in FIG. 12A to those in FIG. 12B, the system controller 200 determines that the dies 33A and 33B are correctly conveyed, and if not, the system controller determines that there is an error occurred, and stops the actuator 31 and issues an alert in the same manner as described above.

Figure 12C:
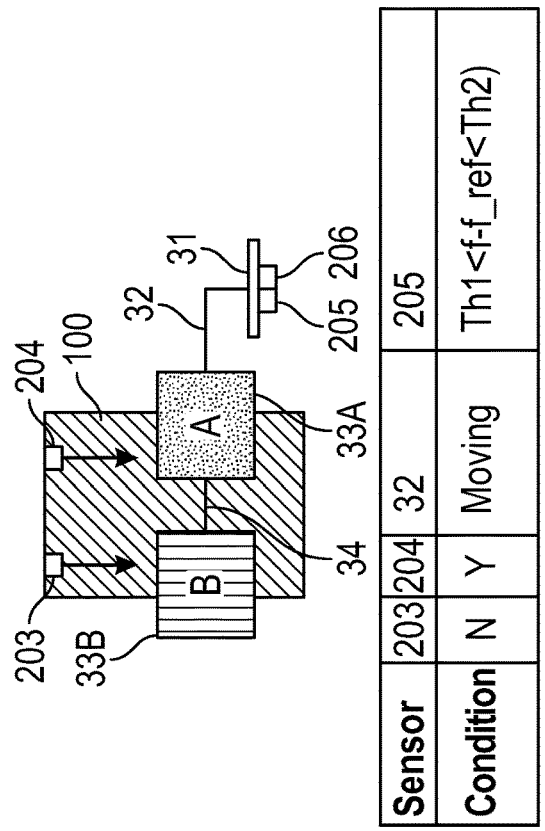

FIG. 12C illustrates the situation where the die 33A is still moving from the position 2 to position 1, and the die 33B is moving from the position 3 to the position 2. In the situation of FIG. 12C, the detecting positions of the sensors 203 and 204 are supposed to be located so that the dies 33B and 33A are detected, respectively. The position sensor 206 is supposed to output different values every time, indicating that the joint 32 is moving. The force applied to the actuator 31 and detected by the load sensor 205 should be the range as described above with reference to FIG. 12A.

If the states of the sensors 203-206 transition from the states in FIG. 12B to those in FIG. 12C, the system controller 200 determines that the dies 33A and 33B are correctly conveyed, and if not, the system controller determines that there is an error occurred, and stops the actuator 31 and issues an alert in the same manner as described above.

FIG. 12D illustrates the situation where the die 33A is moving from the position 2 to position 1, and the die 33B is moving from the position 3 to the position 2. In the situation of FIG. 12D, the detecting position of the sensor 204 is located between the dies 33A and 33B so the sensor 204 is not supposed to detect a die, whereas the sensor 203 is supposed to detect the die 33B. The position sensor 206 is supposed to output different values every time, indicating that the joint 32 is moving. The force applied to the actuator 31 should be the range as described above with reference to FIG. 12A.

If the states of the sensors 203-206 transition from the states in FIG. 12C to those in FIG. 12D, the system controller 200 determines that the dies 33A and 33B are correctly conveyed, and if not, the system controller determines that there is an error occurred, and stops the actuator 31 and issues an alert in the same manner as described above.

It is possible that the states do not transition from the states of FIG. 12B to 12C, if the distance D_s between the detecting positions of the sensors 203 and 204 is smaller than the distance D_m between the sides of the dies 33A and 33B facing each other. In this case there is a situation where the joint 32 is moving, the force f applied to the actuator should be the range described above, and neither the sensor 203 nor the sensor 204 detects a die (the condition for '203' is 'N', and the condition for '204' is 'N'). This may happen depending on D_s, D_m, or the widths of the dies. By using the information of the distances or the widths the system controller 200 predetermines how the states transitions, and set the information in a memory for a reference for checking whether the error occurs.

Figure 12E:
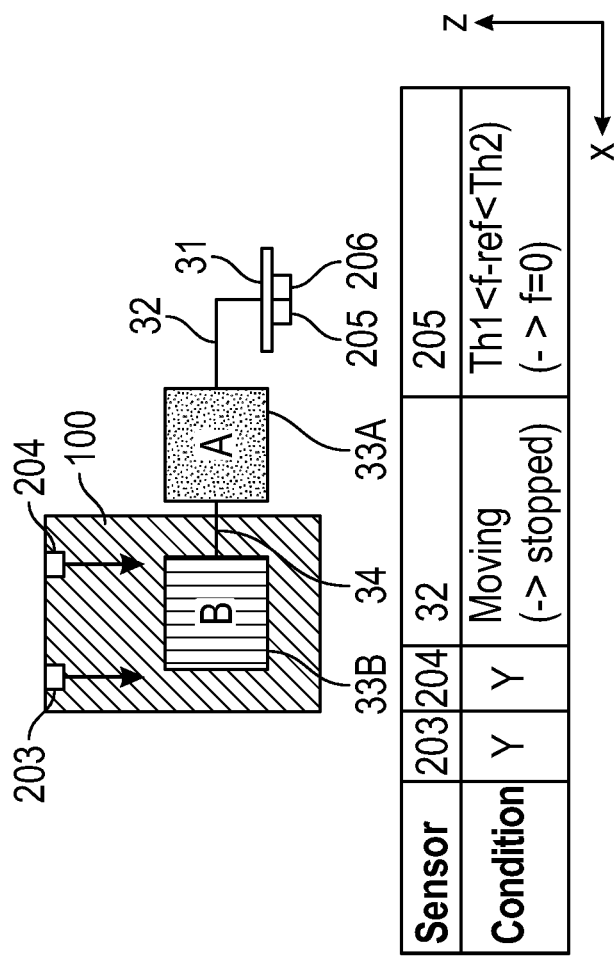

FIG. 12E illustrates the situation where the die 33A arrives at the position 1, and the die 33B arrives at the position 2. In the situation of FIG. 12E, the detecting positions of the sensors 203 and 204 are supposed to be located so that the dies 33B is detected by both the sensors 203 and 204.

Because right after the sensors 203 and 204 detects a die the actuator is supposed to be stopped at the 1$^{st}$ position as described above, the position sensor 206 is supposed to repeatedly output a constant value, indicating that the state of the joint 32 is transitions from 'moving' to 'stopped'. The force applied to the actuator 31 should be turned to 0.

If the states of the sensors 203-206 transition from the states of FIG. 12D to those of FIG. 12E, the system controller 200 determines that the dies 33A and 33B are correctly conveyed, and if not, the system controller determines that there is an error occurred, and stops the actuator 31 and issues an alert in the same manner as described above.

If the states transitions from the states of FIG. 12D to the states not like those illustrated in FIG. 12D, the system the system controller 200 controls the actuator 31 to stop the joint 32 and issues an alert, in response to the position sensor 206 detecting the 1$^{st}$ position, where the joint 32 should be stopped. Even though both the sensors 203 and 204 detects a die, if the force bigger than that in the normal situation of FIG. 12E is applied, there should be some malfunctioning or error occurred somewhere in the system, therefore the system controller 200 notified the situation of the operators.

In another embodiment, the sensors 203 and 204 can be located to detect the joint 34 as well as the dies 33A and 33B, which provides more detailed states of the dies 33A and 33B. in this configuration, all of the 'Y's in FIGS. 12A through 12E should be 'die', meaning that the sensor 203 or 204 is supposed to detect the die 33A or 33B in each situation, and all of the 'N's in FIGS. 12B and 12D should be 'joint', meaning that the sensor 203 or 204 (is supposed to) detect the joint 34 in each situation.

The sensors 203 and 204 may also be able to measure the distance from the sensors to the object to be detected, which enables the system controller 200 can tell what the sensors are detected is a die or a joint.

In yet another embodiment, the injection molding machine can be configured to detect types of die, by providing different patterns, barcodes or colors on the top surface of the dies 33A and 33B, and sensors which can detect the patterns, barcodes or colors are adopted as the sensors 203 and 204. This provides more detailed states of the dies and the actuators. In this configuration both the sensors 203 and 204 are supposed to detect die 33A in the situation of FIG. 12A, the sensor 204 is supposed to detect die 33A in the situation of FIG. 12B, the sensors 203 and 204 are supposed to detect die 33A and die 33B, respectively, in the situation of FIG. 12C, the sensor 203 is supposed to detect die 33B in the situation of FIG. 12D, and both the sensors 203 and 204 are supposed to detect the die 33B in the situation of FIG. 12E.

Detailed procedures of changing dies with respect to the injection molding machine 100 according to another exemplary embodiment are described with reference to FIGS. 13A-13E. This embodiment includes an actuator with each of the tables 301A and 301B and does not include the joint 34 connecting the dies 33A and 33B. Because the configuration of the conveying machines 301A and 301B is different from the above-described embodiment with reference to FIGS. 12A-12E, the states the sensors are supposed to be in are also different. The components and the items of information with the same reference numbers described above are essentially the same components as the items described above, except as otherwise described below.

In FIGS. 13A-13E, the die 33A is connected to a slide actuator 31A with a joint (connection member) 32A, the die 33B is connected to an actuator 32B with a joint (connection member) 32B. The actuators 31A and 31B can be the same as or similar actuator to the actuator 31 as described above, and the joints 32A and 32B can be the same as or similar actuator to the joint 32 as described above. The actuator 31A includes a load sensor 205A and a position sensor 206A, and the actuator 31B includes a load sensor 205B and a position sensor 206B. The load sensors 205A and 205B can be the same as or similar actuator to the load sensor 205 as described above, and the position sensors 206A and 206B can be the same as or similar actuator to the position sensor 206 as described above.

FIGS. 13A-13E illustrate the situations when the die 33A is conveyed out of the position 2 and the die 33B is conveyed into the position 2, and the charts in FIGS. 13A-13E indicate the states the sensors is supposed to be in, in the corresponding illustrated situations. As described above, if the states do transition from states, as illustrated in FIGS. 13A-13E, the system controller 200 determines that the dies are correctly conveyed and there should be no issues or malfunctions. If the states do not transition, as illustrated in FIGS. 13A-13E, the system controller 200 determines that the dies are not correctly conveyed and the system controller 200 prohibits the actuator 31A or 31B from moving the joint 32A or 32B, in other words, the system controller 200 does stop the actuator 31A or 31B. This process prevents the dies and other components from being damaged from possible abnormal movement of the dies 33A and 33B, the joints 32A and 32B, and the actuators 31A and 31B, and operators from being hit by components moving abnormally. Or, this process at least greatly reduces possibilities of these situations.

As described above, additionally or alternatively, the system controller 200 can issue an alert, if the dies are determined as not correctly conveyed.

Figure 13C:
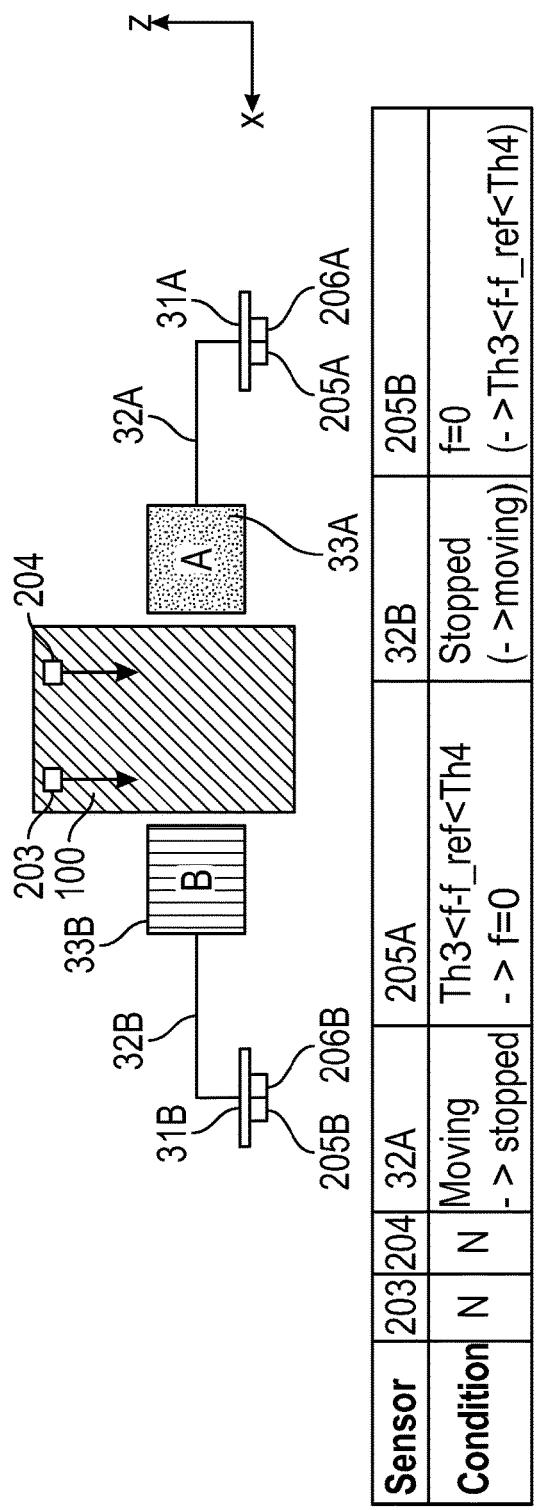

When the die 33B is conveyed out and the die 33A is conveyed in, a person skilled in the art would easily understand that the states and actions for the sensor 204, the die 33A, the joint 32A, the actuator 31A, the load sensor 205A, and the position sensor 206A described above or illustrated in FIGS. 13A-13E should be those for the sensor 203, the die 33B, the joint 32B, the actuator 31B, the load sensor 205B, and the position sensor 206B, and vice versa. FIG. 13A illustrates the situation where the die 33A is at the position 2 and the die 33B is at the position 3, and the dies 33A and 33B are stopped and not moved. In this situation, both the sensors 203 and 204 are supposed to detect the die 33A, the position sensor 206A periodically is supposed to output a constant value, indicating that the die A is not moved, and force detected by the 205A applied to the actuator 31A should be 0. The sensor 206B is supposed to output a constant value indicating that the die 33B is stopped, and the load sensor 205B is supposed to output a value indicating that the force is not applied to the joint 32B.

In response to the system controller 200's confirmation of the states of sensors as described above, the system controller 200 enables the actuator 31A to move the joint 32A to convey the die 33A out of position 2 to the position 1. In response to a trigger from the operator's input via, for example, a switch on the console 200, the actuator 31A starts moving the joint 32A. If the states of the sensors are not like the states illustrated in FIG. 13A, the system controller 200 prohibits the actuator 31 from starting the movement, and issues an alert as described above.

After the operator's input, the condition or the state of the joint 31A according to the sensor 206A is supposed to be changed to 'moving' from 'stopped'. Also, the force f applied to the actuator 31 is supposed to be in a range including f_ref. The f_ref can be defined by the reference curve of the force applied to the joint 32, as illustrated in FIG. 9A. The range can be defined as, for example, $f\_ref'+Th3<f<f\_ref'+Th4$, where the Th3 and Th4 define the minimum and the maximum of (f−f_ref), respectively. If the changes of the states of the actuator 31A are not detected or are not as illustrated in FIG. 13A even after a certain time period has passed since the actuator 31A is started, the system controller 200 stops the actuator 31A and issues an alert as described above.

FIG. 13B illustrates the situation where the die 33A is moving from the position 2 to the position 1, whereas the die 33B is stopped. In this situation the sensor 203 is not supposed to detect a die, whereas the sensor 204 is supposed to detect the die 33A. The load sensor 205A is supposed to output a value in the range described above, and the position sensor 206A is supposed to output different values every time, indicating that the joint 32A is moving. The sensor 206B is supposed to output a constant value indicating that the die 33B is stopped, and the load sensor 205B is supposed to output a value indicating that the force is not applied to the joint 32B. If the states of the sensors 203, 204, 205A, 205B, 206A, and 206B transition from the states in FIG. 13A to those in FIG. 13B, the system controller 200 determines that the dies 33A and 33B are correctly conveyed, and if not, the system controller determines that there is an error occurred, and stops the actuator 31A or 31B and issues an alert in the same manner as described above.

FIG. 13C illustrates the situation where the die 33A arrives at the position 1, whereas the die 33B is still stopped. In this situation neither the sensor 203 nor the sensor 204 is not supposed to detect a die. The load sensor 205A is supposed to output a value in the range described above before the arrival at the position 1 and to output 0 after the arrival at the position 1. The position sensor 206A is supposed to output, before the arrival, different values every time, indicating that the joint 32A is moving. After the arrival, the position sensor 206A is supposed to output a constant value, indicating that the joint 31A is stopped. The sensor 206B is supposed to output a constant value indicating that the die 33B is stopped, and the load sensor 205B is supposed to output a value indicating that the force is not applied to the joint 32B.

In response to the system controller 200's confirmation of the states of sensors as described above, the system controller 200 enables the actuator 31B to move the joint 32B to convey the die 33B out of position 3 into the position 2. In response to a trigger from the operator's input via, for example, a switch on the console 200, the actuator 31B starts moving the joint 32B. After the actuator 31B is started, the sensor 206B is supposed to output different values every time, indicating that the die 33B is moving, and the load sensor 205B is supposed to output a value in the range described above.

If the system controller 200 determines that the states of the sensors transition as described above, the system controller 200 determines that the die 33A is correctly conveyed, If not, the system controller 200 determines that the die 33A or die 33B is not correctly conveyed, stops the actuator 31A or 31B, and issues an alert as described above.

Figure 13D:
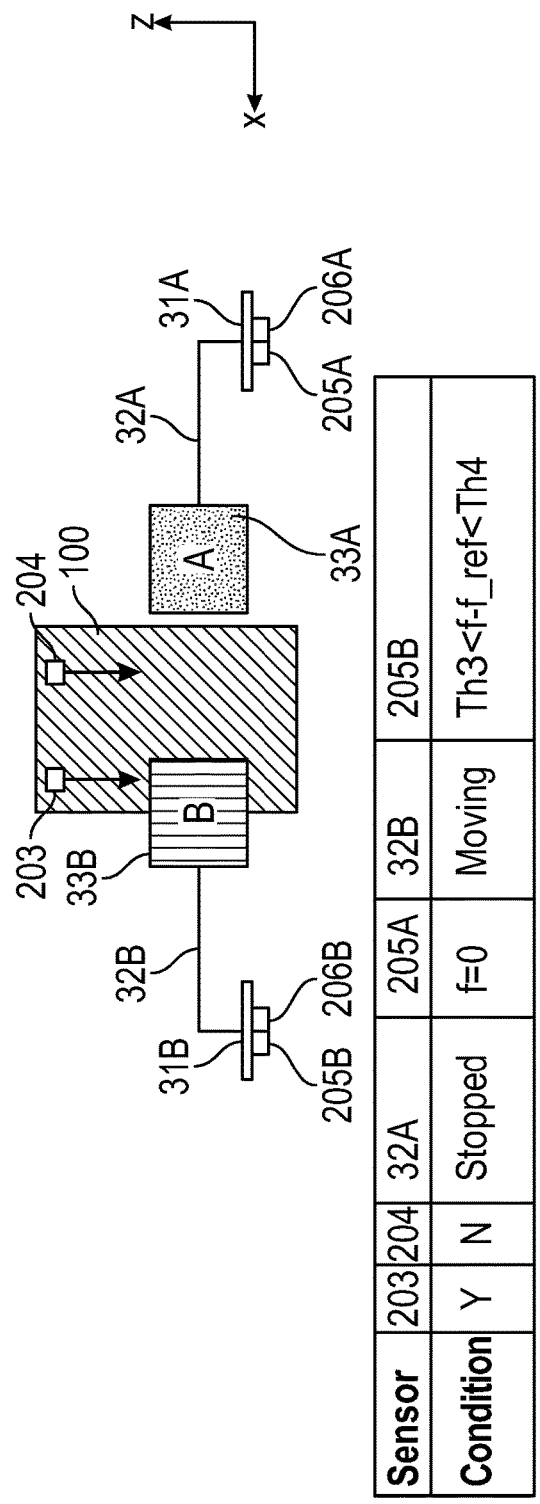

FIG. 13D illustrates the situation where the die 33B is moving from the position 3 to the position 2, whereas the die 33A is stopped, or may be being unloaded from the table 301A or the conveying machine 310A. In this situation the sensor 204 is not supposed to detect a die, whereas the sensor 203 is supposed to detect the die 33B. The load sensor 205B is supposed to output a value in the range described above, and the position sensor 206B is supposed to output different values every time, indicating that the joint 32B is moving. The sensor 206A is supposed to output a constant value indicating that the die 33A is stopped, and the load sensor 205A is supposed to output a value indicating that the force is not applied to the joint 32A. If the states of the sensors 203, 204, 205A, 205B, 206A, and 206B transition from the states in FIG. 13C to those in FIG. 13D, the system controller 200 determines that the dies 33A and 33B are correctly conveyed, and if not, the system controller determines that there is an error occurred, and stops the actuator 31A or 31B and issues an alert in the same manner as described above.

Figure 13E:
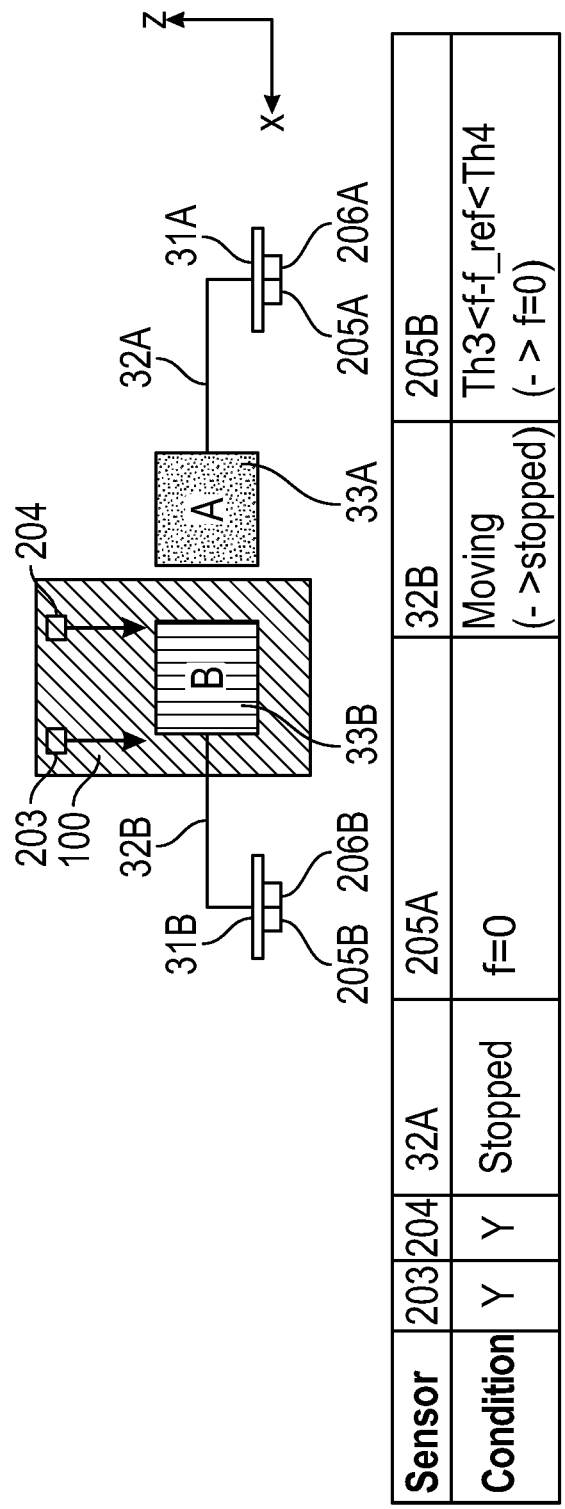

FIG. 13E illustrates the situation where the die 33B arrives at the position 2, whereas the die 33A is still stopped or being unloaded from the table 301A. In this situation both the sensor 203 and the sensor 204 is supposed to detect the die 33B. The load sensor 205A is supposed to output a value in the range described above before the arrival at the position 2 and to output 0 after the arrival at the position 2. The position sensor 206B is supposed to output, before the arrival, different values every time, indicating that the joint 32A is moving. After the arrival, the position sensor 206B is supposed to output a constant value, indicating that the joint 31B is stopped. The sensor 206A is supposed to output a constant value indicating that the joint 31A is stopped, and the load sensor 205A is supposed to output a value indicating that the force is not applied to the joint 32A.

If the system controller 200 determines that the states of the sensors transition as described above, the system controller 200 determines that the die 33B is correctly conveyed, If not, the system controller 200 determines that the die 33B or die 33A is not correctly conveyed, stops the actuator 31B or 31A, and issues an alert as described above.

In another embodiment, the system controller 200 can start the actuator 31B in response to determining that the states of the sensors are as illustrated in FIG. 13B, instead of the states as illustrated in FIG. 13C. This may reduce the time required to change dies. In this case the states of FIG. 13C may not appear after the FIG. 12B situation. Alternatively, the states transitions to states (hereinafter states C'-1) where: the both the sensors 203 and 204 is supposed to detect the dies 33B and 33A, respectively; the load sensor 205A is supposed to output values in the range described above and the position sensor 206A is supposed to output different values every time, indicating that the die 33A is moving; and, the load sensor 205B is supposed to output values in the range described above and the position sensor 206B is supposed to output different values every time, indicating that the die 33B is moving.

In C'-1, neither the sensor 203 nor the sensor 204 may be supposed to detect a die. Because the states C'-1 can be determined depending on the speed of the joint 32A or the joint 32B, the size of the dies 33A and 33B and other reasons, the information of the states C'-1 is stored in a memory and referred to by the system controller 200 to check if there is an error occurred with the conveying procedures.

In yet another embodiment, the system controller 200 can start the actuator 31B in response to a determination that neither the sensor 203 nor the sensor 204 detects a die, instead of waiting the die 33A to stop. This may reduce the time required to change dies. In this case, also, how the states transition when the dies are correctly conveyed should be predetermined by a calculation based on the sizes of the dies 33A and 33B and other components, speeds of the actuators 31A and 31B, and locations of the sensors 203 and 204, It can also be determined experimentally by a pilot run. The information should be stored in a memory of the system controller 200, and is referred to by the system controller 200 to check if there is an error occurred with the conveying procedures.

For both the embodiments of FIGS. 12A-E and FIGS. 13A-E, information of the positions detected by the position sensor 206 (or, the position sensors 206A and 206B) can be used by the system controller 200 to check if the joint 31 (or the joints 31A and 31B) is in a correct area in each of the situations illustrated in FIGS. 12A-12E (or, in FIGS. 13A-13E). The system controller 200 has information of a range of position in which the position of the slider 38 is supposed to be in, in each of the situations. And the system controller 200 refers to the information and the outputs from the sensors 203-206 (or, the sensors 203, 204, 205A, 205B, 206A, 206B), to check if there is an error occurred with the conveying procedures.

<Variations of a Configuration to Move a Die>

A moving configuration for a die (mold) is not limited to the mechanism mentioned above. FIGS. 10A-10H illustrate several variations of a configuration to move a die.

FIG. 10A illustrates a mechanism using a motor and a chain. Dies 1A, 1B are linked by a linking unit 5, and the dies 1A, 1B are on top of a free roller 6. The dies 1A, 1B are linked to a chain 4 going through a free roller 3A, 3B, 3C, 3D respectively. The chain 4 is moved by a motor 2. It can move the dies 1A, 1B in either negative or positive direction of X-axis direction.

By using this mechanism, injection molding machine costs will be cheaper because a single drive source can be used. In addition, the motor 2 is located under the injection molding machine 100, which enables reduction in the size of the injection molding machine 100 in the X direction.

Any number of the free roller can be used. The chain 4 can be a belt. A position of the motor 2 is not limited to the position illustrated in FIG. 10A, and it can be at the positions of other free rollers 3A, 3B, 3C, 3D. In FIG. 10A, the actuator does not move relative to the direction of movement of the dies. Therefore, an overall size of the injection molding machine 100 will be compact.

FIGS. 10B1 and 10B2 illustrate a mechanism using a motor and a cam. Dies 1A and 1B are linked by a linking unit 5, and the dies 1A, 1B are on top of a free roller 6. A cam 3 includes a cam groove to move the dies 1A, 1B in X axis direction, and the cam 3 is rotated by a motor 2. The die 1A is fixed to a lever 4 that includes a rotating body. The rotating body of the lever 4 is inserted into the cam groove of the cam 3. When the motor 2 rotates, the cam 3 rotates, and the lever 4 moves in X-direction according to the rotation of the cam groove of the cam 3. This makes it possible for the dies 1A, 1B to move.

FIG. 10B-1 illustrates a position of the die, and FIG. 10B-2 illustrates velocity curve of the die. When the die is stopped in a state of high acceleration, a large load will impact various parts of the injection molding machine 100, which can damage. By using a cam mechanism, lower acceleration and deceleration can be achieved at the beginning and end of motion, thus reducing the inertial force of the heavy dies. In FIG. 10B, the cam 3 itself does not move relative to the direction of movement of the dies. Therefore, the size of the injection molding machine 100 can be reduced.

FIG. 10C illustrates a mechanism using a toggle mechanism. Dies 1A, 1B are linked by a linking unit 5, and the dies 1A, 1B are on top of a free roller 6. The die 1A is linked to a toggle mechanism 4 fixed to one of the stationary side. This toggle mechanism 4 is linked to an actuator 2 by a linking unit 3. When the actuator 2 moves up and down in Z axis direction, it can expand and extract the toggle mechanism 4 in X-axis direction, and it makes it possible to move the dies 1A, 1B in positive and negative direction of X-axis direction.

By using this mechanism, there can be just one drive source and the injection molding machine 100 costs will be cheaper. Since the actuator 2 can be installed vertically, the size of the injection molding machine 100 can be reduced. The actuator 2 can use an air cylinder, hydraulic cylinder, motor, or single axis robot.

FIG. 10D illustrates a mechanism using a direct acting type actuator rod type. Dies 1A, 1B are linked by a linking unit 5, and the dies 1A, 1B are on top of a free roller 6. The die 1A and actuator 2 are aligned in the X-axis direction via a linking unit 3. When the actuator 2 moves, it can move the dies 1A, 1B in the positive or negative direction of the X-axis.

By using this mechanism, there can be just one drive source, and it can simplify the mechanism of the injection molding machine 100. With fewer numbers of parts, the cost of the injection molding machine 100 will be cheaper. The actuator 2 does not be limited to a rod type, and a slide type actuator, air cylinder, hydraulic cylinder, motor, ball screw mechanism, or single axis robot are applicable.

FIG. 10E illustrates a mechanism using a direct acting type actuator rod type. Dies 1A, 1B are linked by a linking unit 5, and the dies 1A, 1B are on top of a free roller 6. The die 1A is linked through a linking unit 3 to a direct acting type actuator rod type 2, which is located on negative side of the Z-axis direction from dies 1A, 1B. When the direct acting type actuator rod type 2 moves, it can move the dies 1A, 1B in a positive or negative direction of the X-axis.

By using this mechanism, in addition to just one drive source being used, placing the direct acting type actuator rod type 2 on the negative side of the Z-axis direction from the dies 1A, 1B enables reduction in the size of the injection molding machine 100 in the X-axis direction. The actuator 2 is not limited to a rod type, and a slide type, air cylinder, hydraulic cylinder, motor, ball screw mechanism, or single axis robot are applicable.

FIG. 10F illustrates a method that does not directly link dies 1A and 1B. Each dies 1A, 1B is fixed on pallets 5A, 5B respectively, and each pallets 5A, 5B are linked to a chain 4. The chain 4 goes through a free roller 3 and a motor 2. When the motor 2 moves the chain 4, it can move the dies 1A, 1B in a positive or negative direction of the X-axis.

By using this mechanism, in addition to just one drive source being used, placing the motor 2 on negative side of the Z-axis direction from the dies 1A, 1B enables reduction in the size of the injection molding machine 100 in the X-axis direction.

Figure 10G:
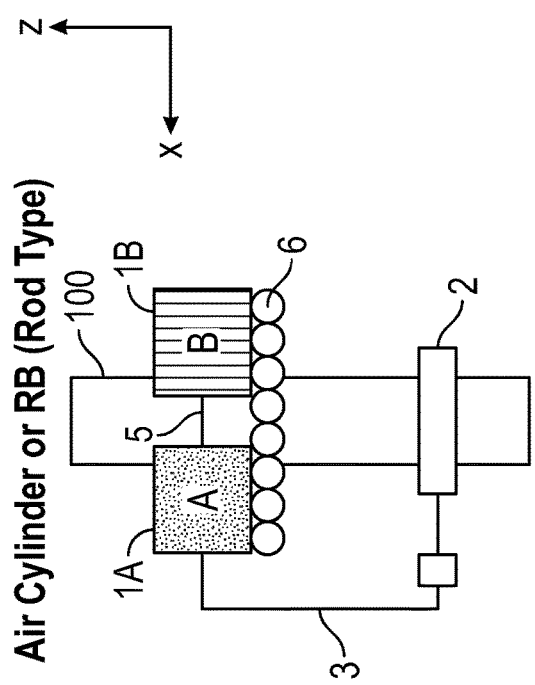

FIG. 10G illustrates a method that does not directly link dies 1A and 1B. An actuator 2 can individually move a slider 3A, 3B both. Each die 1A, 1B is fixed to this sliders 3A, 3B respectively. When the actuator 2 moves, it can move the dies 1A, 1B in a positive or negative direction of the X-axis.

By using this mechanism, in addition to just one drive source being used, placing the motor 2 on negative side of the Z-axis direction from the dies 1A, 1B enables reduction in the the size of the injection molding machine 100 in the X-axis.

Figure 10H:
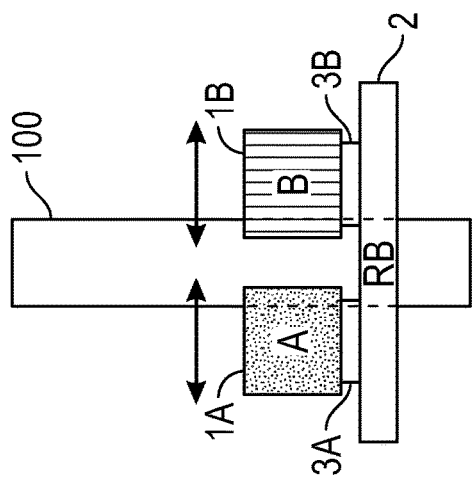

FIG. 10H illustrates attaching wheels to dies. Wheel 7 is attached on the bottom or side of dies 1A, 1B. The dies 1A, 1B are linked by a linking unit 5, and the dies 1A, 1B are on top of a plate 6 that includes travelable surface. The die 1A is linked to a direct acting type actuator 2 that is aligned to the dies in the X-axis direction through a linking unit 3. When the direct acting type actuator 2 moves, it can move the dies 1A, 1B in a positive or negative direction of the X-axis. The wheel 7 is rotated based on a movement of the dies 1A, 1B.

Figure 14:
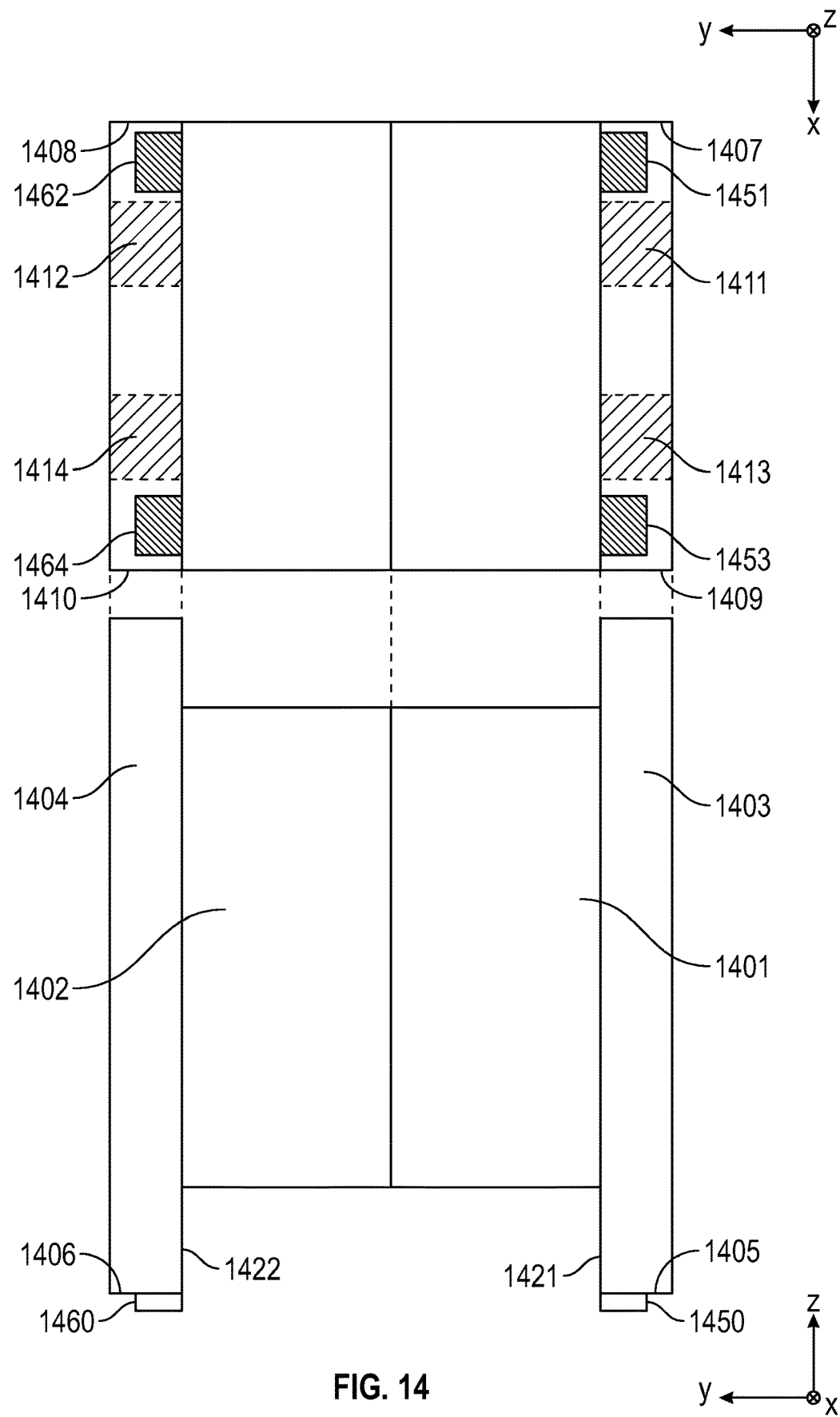
FIG. 14 illustrates a die with wheels, according to an exemplary embodiment.

Details of a die in FIG. 10H is described with reference to FIG. 14. FIG. 14 illustrates a bottom view and a side view of the die. The die includes a first part 1401 to be fixed at a fixed platen of the injection molding machine 100, and a second part 1402 to be movable with a movable platen of the injection molding machine 100, a clamping plate 1403 to be directly in contact with the fixed platen, and a clamping plate 1404 to be directly in contact with the movable platen, and rotatable wheels 1450 fixed on a bottom surface 1405 of the clamping plate 1403, and rotatable wheels 1460 fixed on a bottom surface 1406 of the clamping plate 1404. The bottom surface 1405 of the clamping plate 1403 has an end 1407 and an end 1409 in an X-direction of the die, along which the die moves with the wheels. The clamping plate 1404 also has an end 1408 and an end 1410 in the X-direction. The X-direction can also be a longitudinal direction of the bottom surface 1405 or 1406, when the die is conveyed in and out.

The die can have 4 wheels including 2 wheels 1451 and 1453 on the bottom surface 1405, and the other 2 wheels 1462 and 1464 on the bottom surface 1406. Alternatively, the die can have 2 rows of wheels including a first row of wheels on the bottom surface 1405 and a second row of wheels on the bottom surface 1406. The wheels 1450 and 1460 or the rows of wheels can be directly attached to the clamping plates 1403 and 1404, or can be fixed on plates that are rigidly fixed on the clamping plate 1403 and 1404. The wheels 1450 and 1460 or the rows of wheels can also be provided on bottom surface attachments that are detachably attached to the clamping plates 1403 and 1404. The attachments enable utilization of a die used with standard injection molding machines in the injection molding machine 100 according to the above-described embodiments.

To avoid collisions between the wheels 1450 and 1460 and the clamps, the wheels 1450 and 1460 are not located in regions 1411-1414, where the clamps of the fixed and the movable platens clamp the die. In order to avoid collision with the clamps, a wheel 1451 is fixed at a location close to the one end 1407, which is between the region 1411 and the one end 1407, and a wheel 1453 is fixed at a location close to the other end 1409, which is between the region 1413 and the one end 1409. A wheel 1462 is fixed at a location close to the one end 1408, which is between the region 1412 and the one end 1408, and a wheel 1464 is fixed at a location close to the other end 1410 that is between the region 1414 and the one end 1410. Alternatively, multiple wheels can be fixed instead of the wheel 1451, 1453, 1462, or 1464. Additionally, one or more wheels can be fixed in an area between the regions 1411 and 1413, and one or more wheels can also be fixed in an area between the regions 1412 and 1414. If wheels are fixed to attachments, these attachments may need to be fixed at locations where the wheels are fixed as described above.

The attachment with the wheels can have a fixture mechanism to rigidly and detachably fix the attachment with the clamping plate 1403 or 1404.

The widths of the wheels described above can be the same as the width of the clamping plate 1403 or 1404, or can be larger than the width of the clamping plate 1403 or 1404, to support the die. The wheels 1450 on the clamping plate 1403 can be shifted from the center line extending in a longitudinal direction of the bottom surface 1405 towards a Y positive direction away from the fixed platen. The wheels 1460 on the clamping plate 1404 can be shifted from the center line extending in a longitudinal direction of the bottom surface 1406 towards a Y negative direction away from the movable platen. The wheels 1450 can be protruding outwardly from an inner surface 1421 of the clamping plate 1403, and the wheels 1460 can also be protruding outwardly from an inner surface 1422 of the clamping plate 1404. With this configuration wider wheels can be adopted without increasing the width of the clamping plates, and a load of the wheels and rails on the plate 6 (described below) can be reduced.

When the wheels are protruding, the support structures can be fixed to the clamping plates 1403 and 1404 to support the protruding wheels, and the support structure can also protrude from the inner surfaces 1421 and 1422 to support both ends of the wheels. The above-described attachment can also have the protruding support structure to support the wheels with both ends. The wheel can be supported with only one end, even if the support structure of the wheel protrudes.

The plate 6 (FIG. 10H) can be split into 3 parts, including a first part located on one side of and external to the injection molding machine 100, a second part located internal to the injection molding machine 100, and a third part located on the other side of and external to the injection molding machine 100. The first, second and third parts form a surface that provides the dies 1A and 1B with wheels to move along. The plate 6 can include one or more rails to guide the wheels of the dies 1A and 1B.

By using this mechanism, there can be just one drive source. In addition, because the wheel 7 is attached to the dies, this mechanism does not require as many free rollers as described above. Thus, this mechanism can reduce the number of injection molding machine parts.

The injection molding system includes only one actuator 2 in FIG. 10H. However, the injection molding system can include two actuators for the two dies respectively. The injection molding system includes two dies 1A, 1B in FIG. 10H. However, the injection molding system can include only one die. In this case, the wheel 7 is attached on the bottom or side surface of the die. In another embodiment, the wheel 7 can be attached on both the bottom surface and the side surface of the die. The bottom surface as used herein refers to a surface of the die that faces the plate 6, and the side surface as used herein refers to a surface of the die that faces the platen.

The actuator can be an air cylinder, a hydraulic cylinder, a motor, or single axis robot. By overlapping die movement range in the X-axis direction with the expansion or movement range for the actuator to move dies, the overall size of the injection molding machine 100 can be reduced.

In the above-described embodiments, an operation panel 101 and a system controller 200 can be located on one side of the injection molding machine 100. This configuration makes it easier for the operator to implement injection molding machine related settings, provide instructions, perform maintenance work, while processes after molded parts are completed on the other side.

In the above-described embodiments, the configuration that the operator side is longer than the unloading side enables easier maintenance operations.

In the above-described embodiments, the determination method that determines if the dies have completed the movement correctly by detecting movement volume of the dies on an actuator side, and using the sensors for the dies at the specified position are applicable.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

Additional embodiments and advantages can include one or more of: (i) the die system has operator side and unloading side to improve operational efficiency; (ii) operator side is longer and easier to perform maintenance operations; (iii) the system determines whether movement is completed by position detection of sensor and actuator so that the user is provided with a better understanding of the current status; and (iv) the actuator is located in a position below the injection molding machine so the die system's size is compact.

In some embodiments, the molding system includes an injection molding machine including an operation unit enabling user operation on one side of the injection molding machine, a maintenance unit for maintenance operations on the injection molding machine on one side of the injection molding machine, and an unloading unit for unload parts from the injection molding machine on another side of the injection molding machine.

The injection molding system can also include an injection molding machine. In some embodiments, the system includes a sliding system for sliding multiple die so that a die in the injection molding machine can be switched. The operation unit can also include a user interface that accepts instruction for the injection molding machine. Alternatively or in addition, the operation unit includes a user interface that accepts instruction for the sliding system.

In some embodiments, the injection molding machine functions automatically.

The injection molding system can also accept a predetermined user operation and/or a predetermined user maintenance operation.

In some embodiments, the sliding system past the injection system and first part of the sliding system is located on one side of the injection molding machine and a second part of the sliding system is located on the other side of the injection molding machine. The length of the first part can be longer than the length of the second part.

In other embodiments, the maintenance unit accepts an operation for changing or amending dies in the injection molding machine. The unloading unit has a conveyer to which products can be delivered.

Other features can include one or more of: (i) the sliding system including a slider so that multiple die can slide; (ii) the sliding system including an actuator to move multiple dies; (iii) the actuator being located under the slider; (iv) the actuator being located under the area of the slider; (v) the actuator being located under the area where dies slide.

In an additional embodiment, an injection molding system includes, an injection molding machine including an injection machine, an actuator to move multiple die through the injection machine, a first detecting unit that detects if the actuator instructs a predetermined move, a second detecting unit that detects if there is an object at the predetermined point, a control unit that controls performing a first operation depending on a detection result from the first detecting unit and the second detecting unit, and performing a second operation depending on a detection result from the first detecting unit and the second detecting unit; wherein the first detection unit detects that the multiple dies performed a predetermined move by the actuator instruction.

Additional embodiments can include one or more of: (i) a second detection unit that includes one or more sensors; (ii) each die is injected at an injection point; (ii) one sensor is located on one side of the injection point and another sensor is located on the other side of the injection point; (iii) the two sensors are located near an exit or an entrance of the injection machine; (iv) the two sensors are not located in the center of the injection machine; (v) the first operation is to stop injecting operation; (vi) the second operation is to start injecting to an die in the injection machine; and (vii) when the first detection unit detects that the predetermined move is operated by the actuator instruction.

What is claimed is:

1. An injection molding system, comprising:
an injection molding apparatus configured to perform injection molding with a plurality of dies;
a conveyor apparatus that includes an actuator that provides power to alternately convey a first die of the plurality of dies and a second die of the plurality of dies into the injection molding apparatus for injection of a molded material;
a force detection sensor configured to detect a force applied to the actuator;
a plurality of detection sensors for detecting at least one die of the plurality of dies; and
a controller configured to control the conveyor apparatus to stop a conveying operation based on a detection result by the force detection sensor while the plurality of dies are moved by the actuator, wherein, when the first die is conveyed into the injection molding apparatus, the second die is simultaneously conveyed to a cooling position external to the injection molding apparatus, wherein, when the second die is conveyed into the injection molding apparatus, the first die is simultaneously conveyed to a cooling position external to the injection molding apparatus, and wherein, after finishing conveying the die into the injection molding apparatus, the controller prohibits further conveying operation based on a detection result of the die by each detection sensor of the plurality of detection sensors.

2. The injection molding system according to claim 1, wherein a first detection sensor and a second detection sensor of the plurality of detection sensors are located at the injection molding apparatus.

3. The injection molding system according to claim 1, wherein a first detection sensor and a second detection sensor of the plurality of detection sensors are located at the conveyor apparatus.

4. The injection molding system according to claim 1, further comprising a position detection sensor configured to detect a position of the actuator, wherein the controller is configured to determine whether the conveying apparatus finishes the conveying operation based on a detection result by the position detection sensor.

5. The injection molding system according to claim 1, wherein, in a case where a change amount of the force applied to the actuator is greater than a threshold, the controller is configured to control the conveyor apparatus to stop the conveying operation.

6. The injection molding system according to claim 1, wherein the actuator is connectable to the first die, and wherein the first die is connectable to the second die with a linking unit.

7. The injection molding system according to claim 1, wherein the controller is configured to control the conveyor apparatus to stop the conveying operation in a case where the force applied to the actuator is greater than a threshold.

8. The injection molding system according to claim 1, wherein the controller is configured to control the conveyor apparatus to stop the conveying operation in a case where the force applied to the actuator is less than a threshold.

9. The injection molding system according to claim 1, wherein the controller controls the conveyor apparatus to stop the conveying operation in a case that amount of decrease per a predetermined time of the force applied to the actuator is greater than a threshold.

10. The injection molding system according to claim 1, wherein, when conveyed to the cooling position, the respective one of the first die and the second die is stopped during a cooling period for cooling the injected molded material.

11. The injection molding system according to claim 2, wherein the conveyor apparatus is configured to convey at least one of the first die and the second die from the cooling position in the conveyor apparatus to an injection position in the injection molding apparatus, and wherein in a case where at least one of the first die and the second die is at the injection position, the first detection sensor and the second detection sensor detect the one of the first die and the second die.

12. The injection molding system according to claim 11, wherein, in a case where either the first detection sensor or the second detection sensor does not detect the one of the first die and the second die when the controller determines that the conveyor apparatus finishes the conveying operation, the controller is configured to control the conveyor apparatus to prohibit a next conveying operation.

13. The injection molding system according to claim 2, wherein the conveyor apparatus is configured to convey at least one of the first die and the second die from the cooling position in the conveyor apparatus to an injection position in the injection molding apparatus, and wherein in a case where at least one of the first die and the second die is at the injection position, the first detection sensor and the second detection sensor do not detect the at least one of the first die and the second die.

14. The injection molding system according to claim 13, wherein, in a case where either only one of the first detection sensor or the second detection sensor detects at least one of the first die and the second die when the controller determines that the conveyor apparatus finishes the conveying operation, the controller is configured to control the conveyor apparatus to prohibit a next conveying operation.

15. A method for injection molding using an injection molding system that includes a conveyor apparatus with an actuator configured to alternately convey a die into an injection molding apparatus, a plurality of detection sensors for detecting the die, and a controller, the method comprising:

performing injection molding using the die and the injection molding apparatus;

detecting, by at least one sensor of the plurality of detection sensors, a force applied to the actuator; and controlling the conveyor apparatus to stop a conveying operation based on a detection result by the at least one sensor while the die is moved by the actuator, wherein, after conveying the die into the injection molding apparatus, the controller prohibits further conveying operation based on a result of the detecting.

16. The method of claim 15, wherein an actuator is connected to the die, and a linking unit connects the die to another die, and wherein, in a case where either only one of a first detection sensor or a second detection sensor detects at least one of the die and or the another die when the conveyor apparatus finishes the conveying operation, the controller is configured to control the conveyor apparatus to prohibit a next conveying operation.

17. A method for manufacturing products using an injection molding system that includes a conveyor apparatus with an actuator configured to alternately convey a die into an injection molding apparatus, a plurality of detection sensors for detecting the die, and a controller, the method comprising:

performing injection molding using the die and the injection molding apparatus;

detecting, by at least one sensor of the plurality of detection sensors, a force applied to the actuator; and controlling the conveyor apparatus to stop a conveying operation based on a detection result by the at least one sensor while the die is moved by the actuator, wherein, after conveying the die into the injection molding apparatus, the controller prohibits further conveying operation based on a result of the detecting.

18. The method of claim 17, wherein an actuator is connected to the die, and a linking unit connects the die to another die, and wherein, in a case where either only one of a first detection sensor or a second detection sensor detects at least one of the die and or the another die when the conveyor apparatus finishes the conveying operation, the controller is configured to control the conveyor apparatus to prohibit a next conveying operation.

* * * * *